United States Patent
Ghosh et al.

(10) Patent No.: US 11,348,124 B2
(45) Date of Patent: May 31, 2022

(54) GENERATING AGGREGATED MERCHANT ANALYTICS USING ORIGINATION LOCATION OF ONLINE TRANSACTIONS

(71) Applicant: MasterCard International Incorporated, Purchase, NY (US)

(72) Inventors: Debashis Ghosh, Charlotte, NC (US); Manash Bhattacharjee, Jersey City, NJ (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 328 days.

(21) Appl. No.: 15/259,578

(22) Filed: Sep. 8, 2016

(65) Prior Publication Data

US 2017/0068968 A1    Mar. 9, 2017

Related U.S. Application Data

(60) Provisional application No. 62/215,446, filed on Sep. 8, 2015.

(51) Int. Cl.
*G06Q 20/00* (2012.01)
*G06Q 30/00* (2012.01)
(Continued)

(52) U.S. Cl.
CPC ..... *G06Q 30/0201* (2013.01); *G06Q 20/3224* (2013.01); *G06Q 40/12* (2013.12)

(58) Field of Classification Search
CPC combination set(s) only.
See application file for complete search history.

(56) References Cited

U.S. PATENT DOCUMENTS 7,181,445 B2    2/2007  Bebo
7,908,216 B1*   3/2011  Davis ............... G06Q 20/10
                                                    705/41
(Continued)

FOREIGN PATENT DOCUMENTS

CN    102047249 A    5/2011
CN    102282593 A    12/2011

OTHER PUBLICATIONS

David Montague, Press Release: Expect U.S. ecommerce to exceed 6% of total retail sales for Q4 2011 Dec. 27, 2011 http://www.fraudpractice.com/News_2011CyberHolidaySales.html (Year: 2011).*
(Continued)

*Primary Examiner* — Hafiz A Kassim
*Assistant Examiner* — Matheus Ribeiro Stivaletti
(74) *Attorney, Agent, or Firm* — Armstrong Teasdale LLP

(57) ABSTRACT

Systems and methods for generating aggregated merchant analytics for a sector are provided. The system includes a merchant analytics (MA) computing device in communication with a user computing device. The MA computing device defines a plurality of sectors of a geographic region and receiving transaction data including at least one online transaction associated with a merchant. The MA computing device generates a transaction location identifier for each of online transaction to indicate a location associated with a user device operated by a cardholder associated with the online transaction and links the online transaction to one sector based on the transaction location identifier. The MA computing device generates aggregated merchant analytics for each sector based on the transaction data associated with the online transactions located in the sector and displays the aggregated merchant analytics on the user computing device for analysis.

24 Claims, 19 Drawing Sheets

(51) Int. Cl.
  *G06Q 40/00* (2012.01)
  *G06Q 30/02* (2012.01)
  *G06Q 20/32* (2012.01)

(56) References Cited

U.S. PATENT DOCUMENTS

| | | |
|---|---|---|
| 8,055,578 B1 | 11/2011 | Hallman |
| 8,195,500 B2 | 6/2012 | Tavares et al. |
| 8,306,846 B2 | 11/2012 | Tavares et al. |
| 8,370,264 B1* | 2/2013 | Wei ........................ G06Q 20/12 |
| | | 705/65 |
| 8,417,561 B2 | 4/2013 | Ghosh et al. |
| 8,438,310 B2 | 5/2013 | Muilenburg |
| 8,640,099 B1 | 1/2014 | McGilliard |
| 8,762,175 B1* | 6/2014 | Shutko ............... G06Q 30/0639 |
| | | 705/3 |
| 8,781,874 B2 | 7/2014 | Tavares et al. |
| 9,754,258 B2* | 9/2017 | Sheets ..................... G10L 17/22 |
| 10,089,683 B2* | 10/2018 | Dominguez ........... G06Q 20/40 |
| 10,147,089 B2* | 12/2018 | Powell .................. H04L 9/0894 |
| 10,192,229 B2 | 1/2019 | Ghosh |
| 2002/0194503 A1* | 12/2002 | Faith ..................... G06Q 40/025 |
| | | 726/4 |
| 2007/0100680 A1 | 5/2007 | Kumar |
| 2007/0192347 A1 | 8/2007 | Rossmark |
| 2008/0033587 A1 | 2/2008 | Kurita et al. |
| 2009/0055242 A1 | 2/2009 | Rewari |
| 2009/0132316 A1 | 5/2009 | Florance |
| 2009/0327345 A1* | 12/2009 | Torr ...................... G06F 16/435 |
| 2010/0106611 A1* | 4/2010 | Paulsen ................ G06Q 20/102 |
| | | 705/26.1 |
| 2011/0082718 A1 | 4/2011 | Ghosh et al. |
| 2011/0178844 A1 | 7/2011 | Rane et al. |
| 2011/0264581 A1 | 10/2011 | Clyne |
| 2011/0270705 A1 | 11/2011 | Parker |
| 2011/0302011 A1* | 12/2011 | Yoder .................... G06Q 20/40 |
| | | 705/14.17 |
| 2012/0084117 A1* | 4/2012 | Tavares ................. G06Q 30/00 |
| | | 705/7.29 |
| 2012/0124496 A1 | 5/2012 | Rose et al. |
| 2012/0185311 A1 | 7/2012 | Tavares |
| 2012/0233090 A1 | 9/2012 | Tavares |
| 2012/0296724 A1 | 11/2012 | Faro et al. |
| 2012/0303425 A1 | 11/2012 | Katzin et al. |
| 2012/0311475 A1 | 12/2012 | Wong |
| 2013/0024307 A1* | 1/2013 | Fuerstenberg ....... G06Q 20/386 |
| | | 705/18 |
| 2013/0073464 A1 | 3/2013 | Magpayo et al. |
| 2013/0124263 A1 | 5/2013 | Amaro |
| 2013/0124417 A1* | 5/2013 | Spears ................... G06Q 20/40 |
| | | 705/44 |
| 2013/0262311 A1* | 10/2013 | Buhrmann ........... G06Q 20/326 |
| | | 705/44 |
| 2014/0007100 A1* | 1/2014 | Gu ...................... G06F 9/45558 |
| | | 718/1 |
| 2014/0058815 A1* | 2/2014 | Hiremath ............. G06Q 20/384 |
| | | 705/14.17 |
| 2014/0200962 A1 | 7/2014 | Godshalk |
| 2014/0214635 A1 | 7/2014 | Just |
| 2014/0222551 A1* | 8/2014 | Jain .................... G06Q 30/0246 |
| | | 705/14.42 |
| 2014/0229222 A1* | 8/2014 | Shakil .............. G06Q 10/06313 |
| | | 705/7.23 |
| 2014/0229323 A1 | 8/2014 | Or et al. |
| 2014/0244514 A1* | 8/2014 | Rodriguez ......... G06Q 20/3223 |
| | | 705/71 |
| 2014/0278744 A1* | 9/2014 | Lo Faro ............. G06Q 30/0201 |
| | | 705/7.29 |
| 2014/0279474 A1* | 9/2014 | Evans ................... G06Q 20/40 |
| | | 705/41 |
| 2014/0330721 A1* | 11/2014 | Wang .................... G06Q 40/04 |
| | | 705/44 |
| 2014/0337090 A1* | 11/2014 | Tavares .............. G06Q 30/0201 |
| | | 705/7.29 |
| 2014/0372338 A1 | 12/2014 | Kim et al. |
| 2015/0012303 A1 | 1/2015 | Ghosh |
| 2015/0032565 A1 | 1/2015 | Weis et al. |
| 2015/0058088 A1 | 2/2015 | Unser et al. |
| 2015/0073977 A1 | 3/2015 | Ghosh et al. |
| 2015/0120509 A1* | 4/2015 | Moring .............. G06Q 30/0635 |
| | | 705/26.81 |
| 2015/0134420 A1 | 5/2015 | Unser et al. |
| 2015/0134539 A1* | 5/2015 | Kapur ................ G06Q 20/4012 |
| | | 705/72 |
| 2015/0161705 A1 | 6/2015 | Chauhan et al. |
| 2015/0170077 A1* | 6/2015 | Kara ....................... G06F 16/26 |
| | | 705/7.38 |
| 2015/0186910 A1 | 7/2015 | Cruickshank |
| 2016/0023932 A1 | 1/2016 | Bott et al. |
| 2016/0162986 A1 | 6/2016 | Ghosh |
| 2016/0239321 A1* | 8/2016 | Dong .................. G06F 9/45545 |
| 2016/0328802 A1 | 11/2016 | Howe |
| 2016/0335649 A1 | 11/2016 | Ghosh et al. |
| 2016/0335650 A1 | 11/2016 | Ghosh et al. |
| 2017/0032354 A1* | 2/2017 | Tilahun .............. G06Q 20/3278 |
| 2017/0161742 A1* | 6/2017 | Martin-Bale .......... G06Q 20/02 |
| 2019/0050893 A1* | 2/2019 | Stuttle ................ G06Q 30/0246 |

OTHER PUBLICATIONS

International Search Report and Written Opinion for PCT/US2016/050640, dated Nov. 16, 2016, 12 pages.

International Search Report and Written Opinion for International Application No. PCT/US2016/031758, dated Jun. 29, 2016, pp. 1-12.

International Search Report and Written Opinion for International Application No. PCT/US2016/031759, dated Jun. 29, 2016, pp. 1-12.

International Search Report and Written Opinion for International Application No. PCT/US2016/031764, dated Jun. 29, 2016, pp. 1-12.

Office Action issued in Chinese Application No. 201680065220.X, dated Nov. 2, 2021, 11 pages.

* cited by examiner

GENERATING AGGREGATED MERCHANT ANALYTICS USING ORIGINATION LOCATION OF ONLINE TRANSACTIONS

CROSS-REFERENCE TO RELATED APPLICATIONS

This application claims priority to and the benefit of the filing date of U.S. Provisional Application Ser. No. 62/215,446, filed Sep. 8, 2015, which is hereby incorporated by reference in its entirety.

BACKGROUND OF THE DISCLOSURE

The field of the disclosure relates generally to generation merchant analytics, and, more specifically, to network-based methods and systems for generating aggregated merchant valuation analytics using transaction data associated with merchants in a sector location and displaying the merchant analytics on a user interface.

There are many parties interested in the value of a merchant's business in a particular geographic region, and in particular, the merchant's online business. A merchant's online business includes online transactions that a cardholder initiates by providing payment information of a payment card to an online interface of the merchant rather than physically providing the payment card to the merchant. The online transactions may include electronic commerce ("ecommerce") transactions and transportation transactions. Transportation transactions are transactions related to transportation, such as transactions related to booking flights, hotels, and/or vehicles for travel. The parties interested in a merchant's online business include, but are not limited to, commercial real estate owners, lenders, and brokers, as well as business owners, managers, and/or marketing directors. However, it is difficult to assess the value of a merchant's online business in a particular geographic region. In particular, unlike card present transactions that are associated with the location of a merchant's store where the transaction was initiated, online transactions may be associated with a central merchant location (e.g., a merchant's headquarters). That is, the location associated with the online transactions may not accurately identify the geographic regions where the online transactions were initiated. However, it is difficult to assess the value of a merchant's online business in a manner that facilitates comparison of the merchant to other merchants in varying locations (e.g., in different areas of a city, in different states, in different countries). In particular, it may be difficult to discern which merchants demonstrate improvised key business characteristics—such as growth rate, revenue stability, or consumer traffic—relative to other merchants. In some cases, it is only assumed that certain merchants are "top" earners or "top" locations.

Moreover, it is difficult to assess the value of a merchant's online business in a manner that facilitates comparison of the merchant to other merchants in varying locations (e.g., in different areas of a city, in different states, in different countries). In particular, it may be difficult to discern which merchants demonstrate improvised key business characteristics—such as growth rate, revenue stability, or consumer traffic—relative to other merchants. In some cases, it is only assumed that certain merchants are "top" earners or "top" locations. It may be difficult to assess the performance of the merchant's online businesses in combination with other business of the merchant that may be associated with a merchant location. In situations where financial decisions (e.g., the distribution of marketing funds) are being made based on a relative ranking of merchants, having a more reliable metric to compare and contrast the success of one merchant compared to all other merchants may be beneficial.

BRIEF DESCRIPTION OF THE DISCLOSURE

In one aspect, a method for generating aggregated merchant analytics for a sector is provided. The method may be implemented by a merchant analytics (MA) computing device including at least one processor in communication with a memory, the MA computing device in communication with a user computing device. The method includes defining a plurality of sectors of a geographic region and receiving transaction data for transactions occurring within a predetermined period of time. The transaction data includes at least one online transaction associated with a merchant. The method further includes generating a transaction location identifier for each online transaction, the transaction location identifier indicating a geographic location associated with a user device operated by a cardholder associated with the online transaction. Additionally, the method includes linking, based on the transaction location identifiers, each online transaction to one of the plurality of sectors and generating aggregated merchant analytics for each sector based on the online transactions linked to the sector. The aggregated merchant analytics represent a ranking of each sector within the plurality of sectors. The method includes causing the aggregated merchant analytics to be displayed on the user computing device in conjunction with a map of the defined sectors.

In another aspect, a MA computing device is provided. The MA computing device includes at least one processor in communication with a memory. The MA computing device is in communication with a user computing device. The processor is programmed to define a plurality of sectors of a geographic region and receive transaction data for transactions occurring within the geographic region and a predetermined period of time. The transaction data includes at least one online transaction that is associated with a merchant. The processor is further programmed to generate a transaction location identifier for each online transaction. The transaction location identifier indicates a geographic location associated with a user device operated by a cardholder associated with the online transaction. The processor is further programmed to link, based on the transaction location identifiers, each online transaction to one of the plurality of sectors and generate aggregated merchant analytics for each sector based on the online transactions linked to that sector. The aggregated merchant analytics represent a ranking of each sector within the plurality of sectors. Additionally, the processor is programmed to cause the aggregated merchant analytics to be displayed on the user computing device in conjunction with a map of the defined sectors.

In yet another aspect, a computer-readable storage medium having computer-executable instructions embodied thereon is provided. When executed by a MA computing device including at least one processor in communication with a memory, the computer-executable instructions cause the MA computing device to define a plurality of sectors of a geographic region and receive transaction data for transactions occurring within the geographic region and a predetermined period of time. The transaction data includes at least one online transaction, each online transaction is associated with a merchant. The computer-executable instructions further cause the MA computing device to generate a transaction location identifier for each of the online transactions. The transaction location identifier indicates a geographic location associated with a user device operated by a cardholder associated with the online transaction. Additionally, the computer-executable instructions cause the MA computing device to link, based on the transaction location identifiers, each online transaction to one of the plurality of sectors and generate aggregated merchant analytics representing a ranking of each sector within the plurality of sectors for each sector based on the online transactions linked to that sector. Additionally, the computer-executable instructions cause the MA computing device to cause the aggregated merchant analytics to be displayed on the user computing device in conjunction with a map of the defined sectors.

BRIEF DESCRIPTION OF THE DRAWINGS

FIG. 1 is a schematic diagram illustrating an example multi-party payment card system for enabling payment-by-card transactions and generating aggregated merchant analytics in accordance with one embodiment of the present disclosure.

FIG. 2 is an expanded block diagram of an example embodiment of a computer system used in processing payment transactions that includes a merchant analytics computing device in accordance with one example embodiment of the present disclosure.

FIG. 3 illustrates an example configuration of a server system such as the merchant analytics computing device of FIG. 2.

FIG. 4 illustrates an example configuration of a client system shown in FIG. 2.

FIG. 5 is a simplified data flow diagram for generating merchant analytics using the merchant analytics computing device of FIG. 2.

FIGS. 6-17 are example screenshots of a user interface of a user computing device, including merchant analytics generated by the merchant analytics computing device of FIG. 2.

FIG. 18 is a simplified diagram of an example method for generating merchant analytics and displaying said analytics on a user interface using the merchant analytics computing device of FIG. 2.

FIG. 19 is a diagram of components of one or more example computing devices that may be used in the environment shown in FIG. 2.

Figure 1:
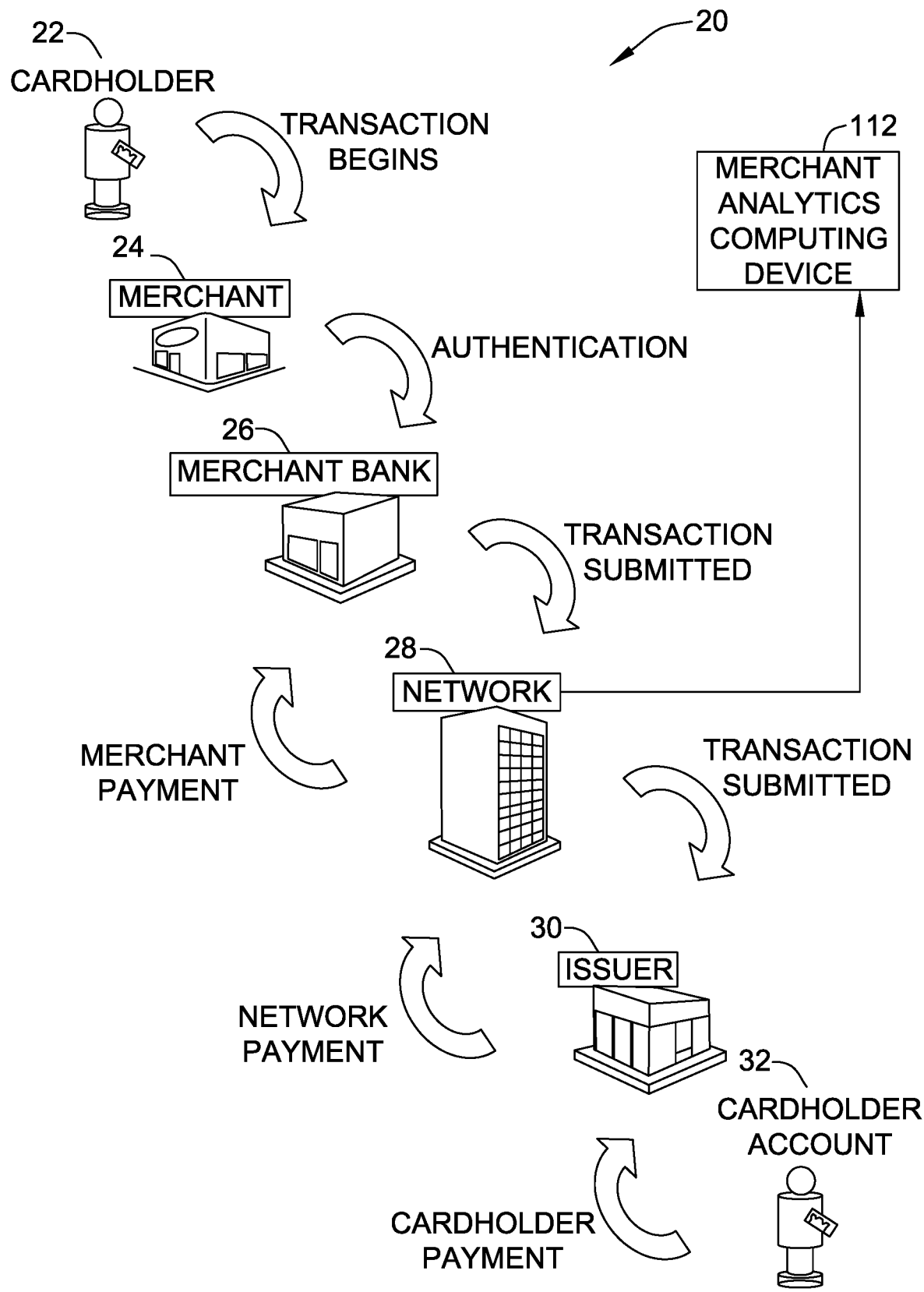
FIGS. 1-19 show example embodiments of the methods and systems described herein.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The systems and methods described herein facilitate the generation of aggregated merchant valuation analytics for transaction data located in an established or defined sector of a plurality of merchants, and the presentation of said analytics to a user on an interactive user interface. The system described herein (i) receives transaction data associated with a plurality of merchants in a geographic region; (ii) processes the transaction data to generate aggregated merchant analytics for a plurality of sectors in the geographic region; and (iii) presents said analytics to a user on an interactive user interface. The aggregated merchant analytics may be directed toward five key characteristics of a merchant or a sector including multiple merchants: growth, stability, size, traffic, and ticket size (and a composite or aggregation of those characteristics). In the example embodiment, the system is configured to selectively generate and present merchant analytics for merchant locations and/or ecommerce and transportation transactions. As used herein, "online transactions" collectively refer to ecommerce and transportation transactions.

The systems and methods described herein are implemented by a computing device that may be referred to as a "merchant analytics computing device". The merchant analytics (MA) computing device includes a processor in communication with a memory. The MA computing device is configured to: (i) define a plurality of sectors of a geographic region; (ii) receive transaction data for transactions occurring within a predetermined period of time, the transaction data including at least one online transaction, each online transaction associated with a merchant; (iii) generate a transaction location identifier for each online transaction, the transaction location identifier indicating a geographic location associated with a user device operated by a cardholder associated with the online transaction; (iv) linking, based on the transaction location identifiers, each online transaction to one of the plurality of sectors; (v) generate aggregated merchant analytics for each sector based on the online transactions linked to that sector, wherein the aggregated merchant analytics represent a ranking of each sector within the plurality of sectors; and (vi) cause the aggregated merchant analytics to be displayed on the user computing device in conjunction with a map of the defined sectors.

Sector Definition Phase

The MA computing device is configured to define a plurality of "merchant sectors," "sector locations," or "sectors" (used interchangeably herein). More specifically, the MA computing device is configured to divide up a geographic region (e.g., a country, state, city, county, etc.) into a plurality of sectors containing merchants therein (i.e., a subset of a plurality of merchants located within the geographic region). The sector may be defined by a geographic boundary containing the plurality of merchants therein. In an example embodiment, sectors are defined according to census blocks, and the geographic boundaries of a sector correspond to the geographic boundaries of the census block. In some embodiments, each sector includes a minimum of five merchants. Accordingly, where a sector is initially defined as a census block including fewer than five merchants, the geographic boundaries of the sector are expanded or adjusted to include at least one additional census block until the sector includes at least five merchants. In some embodiments, each sector may include up to n merchants, where n is an integer greater than five.

Additionally or alternatively, the MA computing device may be configured to divide up the geographic region into a plurality of sectors containing online transactions associated with the merchants therein. In particular, the MA computing device may divide the geographic region based on a plurality of ecommerce and/or transportation (i.e., online) transactions associated with the merchants that are within the geographic region. In some embodiments, each sector includes a minimum of five merchants with online transactions in the sector. In certain embodiments, each sector includes a minimum of five online transactions for a merchant in the sector. Accordingly, where a sector is initially defined as a census block including fewer than five merchants with online transactions (or fewer than five online transactions for a merchant), the geographic boundaries of the sector are expanded or adjusted to include at least one additional census block until the sector includes at least five merchants with online transactions (or the sector includes at least five online transactions of a merchant). In some embodiments, each sector may include up to n merchants or n online transactions, where n is an integer greater than five.

As described above, sectors may be defined on a geographic scale as small as a census block (which may be as small as a city block). However, sectors at the census block level may be "rolled up" or aggregated into larger, block-group level sectors, which may correspond to block groups as defined by the United States Census Bureau. Block-group level sectors may be rolled up or aggregated into large sectors, such as city- or county-level sectors, which themselves may be rolled up or aggregated into state- or nation-level sectors. The (geographic) size of the sectors may depend, in an example embodiment, on a user's view of a map on an interactive user interface, the map displaying the defined sectors. For example, is a user is viewing an entire nation, the sectors may be displayed at a state level. If the user is viewing a particular county, the sectors may be displayed at a block-group or block level.

As will be described further herein, the MA computing device is configured to determine "aggregated merchant analytics" for each sector based at least in part on received transaction data for the merchants located in the sector and the merchants with ecommerce or transportation transaction occurring within the sector. The merchant analytics are indicative of the financial success of the sector relative to other sectors in that geographic region. For example, the MA computing device ranks or scores a sector relative to other sectors in a county or in a state. In one example embodiment, the MA computing device is configured to determine and provide merchant analytics, which may include a numerical score, for a sector based on aggregated merchant analytics for individual merchants located within the sector. For example, if a sector includes five merchants, the MA computing device may process transaction data for each individual merchant to generate analytics for each particular merchant. The MA computing device may then aggregate the individual analytics to determine "aggregated merchant analytics" for the sector as a whole. A weighted average may also be used, which may give more weight to certain merchants in the sector. Alternatively, the MA computing device may determine the aggregated merchant analytics for the sector using any other aggregation or combination of the individual merchant analytics.

The MA computing device may define or establish the sectors before receiving the transaction data. For example, the MA computing device may use available public information (e.g., census data) to define sectors, each sector including at least five merchants located and/or associated with online transactions located therein, as described above. In some other embodiments, the MA computing device may define the sectors using the received transaction data.

For example, the MA computing device may use merchant identifiers included in the transaction data to identify a location of each merchant, and then define the sectors. The transaction data may include information that enables the MA computing device to determine whether a transaction is an online transaction and/or where the online transaction is located (e.g., the location where the online transaction was initiated or an associated cardholder's address). In the example embodiment, the transaction data includes an online flag for each transaction to indicate whether the transaction is an online transaction. In some embodiments, the transaction data may not include the online flags. In certain embodiments, the MA computing device may identify online transactions based on merchant identifiers included in the transaction data. In one example, a merchant identifier associated with a central location of a merchant (e.g., a corporate headquarters of the merchant) may indicate the transaction is an online transaction.

If the MA computing device determines a transaction is an online transaction, the MA computing device may be configured to retrieve cardholder computing device data such as an internet protocol (IP) address, device identification data, and unique device identification (UDID) data to create a virtual location identifier of the online transaction. The virtual location identifier may include the location of the user computing device used to initiate the online transaction or an address associated with the cardholder (e.g., a billing address).

The MA computing device is configured to generate a transaction location identifier for each transaction of the transaction data. The transaction location identifier may be used to determine which sector the transaction is located within for analysis and display. The transaction location identifier includes at least the merchant identifier and a location. For transactions initiated at a merchant location, the location may be indicated by a location included in the merchant identifier (i.e., the merchant location). The location may be indicated by the virtual location identifier for online transactions. The location may be a country, state, zip code, zip+4, county, city, neighborhood, and/or region (e.g., Midwest United States). For example, a cardholder initiates an online transaction with "Company A" at the cardholder's home in zip code 55555. The transaction location identifier may be displayed as "COMPANYA_55555", which includes a merchant identifier ("COMPANYA") and a location (zip code 55555). The location of the transaction location identifier may be independent of defining sectors. If the location of the transaction location identifier spans multiple sectors, the MA computing device may request or retrieve additional location information from the virtual location identifier or the merchant location identifier until the transaction location identifier is within a single sector.

In some embodiments, the MA computing device is configured to associate at least some online transactions made using a digital wallet to a physical merchant location rather than a location associated with the cardholder. In particular, for a transaction made using a digital wallet, the digital wallet is configured to retrieve additional metadata associated with the transaction from the merchant. The metadata may include, for example, an additional merchant identifier, a merchant location identifier (e.g., an address of the merchant), and/or a delivery method of the purchased goods or services (e.g., online or physical delivery). The MA computing device is configured to analyze the metadata to generate the transaction location identifier. For products purchased online that are associated with a particular merchant location, the MA computing device uses the metadata to generate a transaction location identifier associated with the merchant location for the online transaction.

In one example, a cardholder shops at an online merchant that provides an aggregated food delivery service for a plurality of restaurants. When the cardholder orders delivery from a particular restaurant through the online merchant using the cardholder's digital wallet, the digital wallet retrieves metadata from the online merchant that includes a merchant identifier and address associated with the restaurant that provides the ordered food. The MA computing device analyzes the metadata and generates a transaction location identifier associated with the restaurant that provides the ordered food. That is, the MA computing device treats the online transaction like a transaction made at the restaurant. In another example, a cardholder initiates an online transaction for furniture from a merchant with multiple merchant locations using a digital wallet. The furniture is to be delivered from a candidate merchant location. The digital wallet is configured to retrieve metadata from the merchant that identifies the candidate merchant location. The MA computing device analyzes the metadata and generates a transaction location identifier associated with the candidate merchant location based on the analyzed metadata.

The MA computing device may store transaction data, defined sectors, virtual identifiers, transaction location identifiers, and/or merchant analytics (aggregated and/or individual) in a database. In another embodiment, the MA computing device store the data in a different memory. The database or memory is configured to provide the data within a searchable and/or sortable table. The table may be search and/or sorted by, for example, sector, merchant, industry, timestamp, and transaction amount. Each merchant for which associated transaction data and/or scores are stored may be indexed or identified in the database by at least one sector identifier and/or by merchant industry. Accordingly, the MA computing device may be configured to not only provide analytics for sectors, but may also be configured to provide analytics for particular industries and/or for particular merchants within that industry. The searchable and/or sortable table enables the MA computing device to easily generate merchant analytics for one or more sectors, merchants, or industries without parsing all transaction data stored in the database or memory. For example, the MA computing device may generate merchant analytics for a plurality of sectors in Charlotte, N.C., USA, relative to other sectors in North Carolina and may generate analytics for a particular restaurant in Charlotte relative to other restaurants in the city of Charlotte, the state of North Carolina, or the United States. Moreover, a particular merchant may be indexed by (i.e., be located in) multiple sectors. For example, a merchant at Charlotte-Douglas Airport may be included in a "block" sector (named as such because such a sector may take up an area as small as a city block, in some embodiments the smallest available sector division), a "block group" sector (representative of an area that is small but that includes at least one "block" sector, for example, a census tract), a Mecklenburg County sector, a Charlotte (city) sector, a North Carolina sector, and a United States sector.

Setup Phase

In the example embodiment, the MA computing device is configured to receive information describing a merchant in a merchant management portfolio during a configuration period referred to as a "Setup Phase". In an example embodiment, a user (e.g., a commercial real estate owner or lender, a business owner, or marketing director) may access the MA computing device (directly or via any suitable client user computing device in communication with the MA computing device) and may provide such information. Information describing or associated with particular merchants may be referred to as "merchant definitions," and may be used to identify and/or evaluate (e.g., score) each merchant. Merchant definitions include information associated with merchant locations including property identifiers, property location information, and merchant classification information. In certain implementations, merchant definitions include information associated with a merchant's ecommerce and/or transportation business. In some implementations, merchant definitions may further include information relating to the real estate asset or property of which the merchant is a tenant (or owner), as described in co-owned U.S. patent application Ser. No. 14/564,440, the contents of which are herein incorporated by reference. For example, merchant definitions may further include pricing of a real estate asset, vacancy factors of the asset, square footage of the asset, tax information associated with the asset, and other data that may be used to adjust the analytics (e.g., valuation) of a tenant merchant and/or of a real estate asset. The user may also provide various other data associated with the user ("user data"). For example, in implementations in which the user is associated with a business (e.g., a merchant), the user may import or provide various metrics associated with the business, including budgets, marketing data, and/or goals (e.g., increase growth, increase ticket size, increase traffic).

As used herein, "merchant management portfolio" (alternately referred to as a "portfolio") refers to a collection of merchants in different locations but managed by one entity or user, generally. In the example embodiment, a merchant management portfolio may be described by merchant definitions and/or user data and may be represented as an electronic record that may be referred to as a "merchant management portfolio record" or a "portfolio record". In some embodiments, the merchant management portfolio may include online transactions associated with one or more merchants over a plurality of sectors. Accordingly, the MA computing device processes merchant definitions and any imported user data associated with a plurality of merchants to create a portfolio record.

"Property identifiers" may include known names (or any suitable unique alphanumeric identifier) of commercial real estate assets of which a merchant is a tenant, owner, etc. (e.g., "XYZ Mall"). In an example embodiment, the MA computing device uses property identifiers to designate a location for each merchant within the portfolio record. As described below, a user may accordingly view and manage individual merchants within a portfolio distinguished by identifiers including property identifiers.

"Property location information" may include any information defining the geographic location of a merchant. In some examples, property location information may include physical addresses, geographic coordinates in latitude and longitude, elevation information (e.g., a floor or floors of a building associated with a commercial real estate asset), and any other suitable information. In some examples, property location information may include boundary information defining a physical area (or areas) containing the merchant. In an example embodiment, property location information may be used by the MA computing device to identify the merchant graphically (i.e., to provide visually mapped information showing the physical location of the merchant).

Online transactions may not be associated with property identifiers or property location information. Alternatively, property identifiers and property location information associated with online transactions may include information that indicates the transactions are online transactions. For example, a property identifier of an online transaction may designate a shipping origin (e.g., a warehouse) associated with the merchant. Property location information of an online transaction may include information relating to a central location of the merchant, such as corporate headquarters.

"Merchant classification information" includes information categorizing the merchant within categories that may be relevant to the monitoring of the value of the merchant. For example, merchant classification information may categorize a merchant according to a particular industry, location, or other classification, for example, "retail", "office", "warehouse", "manufacturing", "healthcare," "outdoor mall", "indoor mall" and any other suitable information.

The MA computing device may also generate a unique portfolio identifier in the Setup Phase to identify the portfolio record. Accordingly, a user device (operated by a user) may provide such a portfolio identifier at a later point in time and retrieve the portfolio record to review or monitor portfolio defined by the portfolio record.

In at least some examples, the user data received by the MA computing device includes a plurality of investment goals associated with each merchant and/or with the portfolio. At least parties associated with the portfolio (e.g., commercial owners or lenders, marketing directors, investors, managers) may have varying financial goals for a portfolio. Because investors and lenders may vary in their underlying interests, the MA computing device may be configured to monitor merchants pursuant to such investment goals. For example, the MA computing device may be configured to identify certain merchants meeting or exceeding the investment goals and other merchants not meeting the investment goals, such that the investors may make financial decisions regarding the relative worth or success of the various merchants. The user data may also include various specifications descriptive of existing merchants and/or merchant locations in the portfolio or descriptive of merchants and/or merchant locations outside of the portfolio (in the case of a commercial real estate broker looking to buy, rent, or lease a merchant location).

In one particular example, a business may own, or otherwise be associated with, multiple merchants at multiple merchant locations. A user interested in the marketing money invested in the various merchants (e.g., a marketing director or Chief Marketing Officer) may import investment goals to the MA computing device that accord with the goals of the business. For example, the user may have a marketing budget of $500 million. The investment goals may prioritize the merchants with the highest growth, such that a higher percentage of the marketing budget may be spent near those merchants. Similarly, the user may prioritize online marketing to a sector with the highest growth of online transactions for the merchants. The investment goals may alternatively prioritize merchants with the highest traffic, highest ticket size, or highest stability. Accordingly, as will be described further herein, the MA computing device may use the investment goals to identify the merchant(s) with the strongest merchant analytics (e.g., highest scores) to the user.

Evaluation Phase

In an example embodiment, the MA computing device generates analytics (e.g., a score) associated with a merchant or a sector in a process that may be referred to as the "Evaluation Phase". The MA computing device is configured to generate the analytics based on received transaction data associated with the merchant or sector. As used herein, "transaction data" may include transaction amounts, merchant identifiers, online flags, account identifiers, associated time and date stamps, and data descriptive of the product(s) purchased. Merchant identifiers may include an identifier of the merchant at which the transaction was initiated as well as an identifier of the physical location (e.g., a street address, geographic coordinates, etc.) of the merchant. In the example embodiment, the MA computing device receives transaction data from a payment processor integral to or associated with a payment processing network. In some embodiments, the transaction data is anonymized and aggregated by merchant prior to receipt by the MA computing device (i.e., no personally identifiable information (PII) is received by the MA computing device). In other embodiments, the MA computing device may be configured to receive transaction data that is not yet anonymized and/or aggregated, and thus may be configured to anonymize and aggregate the transaction data. In such embodiments, any PII received by the MA computing device is received and processed in an encrypted format, or is received with the consent of the individual with which the PII is associated. In situations in which the systems discussed herein collect personal information about individuals including cardholders or merchants, or may make use of such personal information, the individuals may be provided with an opportunity to control whether such information is collected or to control whether and/or how such information is used. In addition, certain data may be processed in one or more ways before it is stored or used, so that personally identifiable information is removed.

The MA computing device may generate multiple merchant analytics for each merchant and may generate "aggregated merchant analytics" for each sector. Aggregated merchant analytics refer generally to an average, weighted average, or any other aggregation of individual merchant analytics generated for merchants and/or online transactions located in the sector. For example, the "merchant analytics" may include at least one of a growth score, a stability score, a size score, a ticket size score, a traffic score, and a composite score for each sector. A "growth score" is a ranking of the growth of the sector relative to other sectors in the geographic region, wherein "growth" refers generally to sales revenue growth over a period of time. A "stability score" is a ranking of the stability of the sector, wherein "stability" refers generally to a maintenance of sales revenue within a range of sales revenues around an average. A "size score" is a ranking of the size of the sector, wherein "size" refers generally to total sales revenue. A "traffic score" is a ranking of the traffic of the sector, wherein "traffic" refers generally to a number of monthly transactions. A "ticket size score" is a ranking of the ticket size of the sector, wherein "ticket size" refers generally to a transaction amount, and may be calculated by dividing the size by the traffic (i.e., dividing sales revenue by the number of transactions). A "composite score" is a composite of the previous five scores (growth, stability, size, traffic, and ticket size), to provide an overall ranking of the sector. Where the general term "score" without a modifier is used herein, it may refer collectively to any or all of the preceding scores to describe characteristics shared by some or all of the scores. Each of these scores (collectively "analytics") may be generated for each merchant within a sector and may be subsequently aggregated to generate aggregated merchant analytics for the sector.

In the example embodiment, the score is normalized to be between 0 and 1,000. In some embodiments, a higher score indicates a "better" sector (i.e., a higher relative ranking). For example, a sector with a score of 800 may rank higher on any or all of the above-described factors than a sector with a score of 300. A "Better" sector refers to a sector that is preferred over other sectors (or is performing better) based upon the financial transactions performed at merchants located within that sector.

In the example embodiment, the MA computing device receives transaction data associated with merchants that spans a period of time. For example, the MA computing device may receive and process transaction data for a merchant or sector that spans between one month and at least two years prior to the date of receipt. Accordingly, the MA computing device may generate the analytics as functions of time. For example, a growth score would be meaningless if there were no transaction data for a past date from which to determine relative growth. In the example embodiment, the MA computing device generates analytics for each merchant and/or sector using 12 months' or one year's worth of transaction data for the merchant and/or sector. Accordingly, a growth score is representative of the growth of the sector over the past year, the stability score is representative of the stability of the sector over the past year, etc. In other embodiments, the MA computing device may be further configured to determine a "spot" score of any of the above-described scores, wherein a "spot" score refers generally to a score calculated for a shorter period of time, for example, three months as opposed to twelve months. The spot score may be used to determine changes in the characteristics of the merchant over a short period of time that may be masked or hidden when scoring the merchant over a year. For example, if a merchant debuted a new, highly anticipated product two months ago, a dramatic increase in sales growth over those two months may be dulled by looking at the full year's growth. As another example, if a sector (e.g., a particular city neighborhood) enacted multiple marketing campaigns over the course of a year, it may be difficult to determine which particular campaign was the most effective in increasing traffic, if the entire year's worth of transaction data is used to score the sector.

In one embodiment, the MA computing device may determine a growth score for a merchant using the received transaction data over a period of time (e.g., a year). The MA computing device determines the increase or decrease in the sales revenue for the merchant over that year based on the aggregation of all of the transaction data associated with the merchant. Additionally or alternatively, the growth for a merchant may be calculated by fitting total sales revenue to a regression line and tracking resulting slopes. Additionally or alternatively, quarterly sales revenue (i.e., 3-months' worth of sales revenue data) may be calculated and compared to the corresponding quarter of the previous year. As the growth score is a relative ranking, the MA computing device may compare the determined growth of each merchant prior to providing the numerical growth score for each merchant. The MA computing device may then use the growth scores of all of the merchants in a sector to determine an aggregated growth score for the sector (e.g., an average or weighted average of the merchant growth scores for the merchants within the sector). Alternatively, the MA computing device may use the determined growth of each merchant in a sector to determine an aggregated growth score for the sector and may subsequently compare sectors. The MA computing device may then provide the (numerical) growth score for the sector.

In one embodiment, the MA computing device may determine a stability score for a merchant using the received transaction data over a period of time (e.g., a year). The stability of a merchant is a metric or analytic of the volatility of the merchant's cash flow. The MA computing device may determine an average sales revenue for the merchant over a year or may receive an average sales revenue for the merchant (which may be an "expected" average sales revenue or other value received from a user associated with the merchant or may be retrieved from a database). The MA computing device may then determine a range around that average (e.g., one standard deviation, a certain percentage or fraction of the average, or any other suitable range) which indicates stable sales revenue. Using aggregated transaction data, the MA computing device identifies whether the merchant had sales revenue within that range. Falling outside of the range indicates less stable sales revenue and lowers the ranking of the merchant in terms of stability. The MA computing device may use monthly transaction data to determine, at each month, whether the merchant had sales revenue within the predetermined range. Alternatively, the MA computing device may use transaction data from any other interval (i.e., each week, every two weeks, over the year, etc.) to determine the stability of the sales revenue of the merchant. As the stability score is a relative ranking, the MA computing device may compare the determined stability of each merchant prior to providing the numerical stability score for each merchant. The MA computing device may then use the stability scores of all of the merchants in a sector to determine an aggregated stability score for the sector (e.g., an average or weighted average of the merchant stability scores for the merchants within the sector). Alternatively, the MA computing device may use the determined stability of each merchant in a sector to determine an aggregated stability score for the sector and may subsequently compare sectors. The MA computing device may then provide the (numerical) stability score for the sector.

In one embodiment, the MA computing device may determine a size score for a merchant using the received transaction data associated with the merchant over a period of time (e.g., a year). The size metric or analytic may be considered a proxy analytic for how large a particular merchant or business is. The MA computing device may aggregate the total sales revenue for the merchant for each month in the year, or over the whole year. As the size score is a relative ranking, the MA computing device may compare the determined size of each merchant prior to providing the numerical size score for each merchant. The MA computing device may then use the size scores of all of the merchants in a sector to determine an aggregated size score for the sector (e.g., an average or weighted average of the merchant size scores for the merchants within the sector). Alternatively, the MA computing device may use the determined size of each merchant in a sector to determine an aggregated size score for the sector and may subsequently compare sectors. The MA computing device may then provide the (numerical) size score for the sector.

In one embodiment, the MA computing device may determine the traffic score for a merchant using the received transaction data over a period of time (e.g., a year). The MA computing device may identify a number of transactions completed at the merchant for the entire year to determine the traffic for the merchant, or may identify the number of transactions for each month in the year. Additionally or alternatively, other data may be used to determine the traffic at a merchant, including mobile device signal data, as described in co-owned U.S. patent application Ser. No. 14/708,020, the contents of which are hereby incorporated by reference. As the traffic score is a relative ranking, the MA computing device may compare the determined traffic of each merchant prior to providing the numerical traffic score for each merchant. The MA computing device may then use the traffic scores of all of the merchants in a sector to determine an aggregated traffic score for the sector (e.g., an average or weighted average of the merchant traffic scores for the merchants within the sector). Alternatively, the MA computing device may use the determined traffic of each merchant in a sector to determine an aggregated traffic score for the sector and may subsequently compare sectors. The MA computing device may then provide the (numerical) traffic score for the sector.

In one embodiment, the MA computing device may determine a ticket size score for a merchant using the received transaction data over a period of time (e.g., a year) and/or using the determined size and traffic for the merchant. The ticket size (also referred to herein as an "average ticket size") enables improved visibility into the types of merchant in a sector. A low average ticket size, for example, around $5, may indicate a sector includes restaurants or coffee shops. A higher average ticket size, for example, around $2,000, may indicate a sector includes jewelry stores, electronics merchants, or furniture stores. The MA computing device may calculate the ticket size for the merchant by dividing a sales revenue of the merchant by a number of transactions. Alternatively, the MA computing device may calculate the ticket size by dividing a size of the merchant as determined above, by a traffic of the merchant, as determined above. As the ticket size score is a relative ranking, the MA computing device may compare the determined ticket size of each merchant prior to providing the numerical ticket size score for each merchant. The MA computing device may then use the ticket size scores of all of the merchants in a sector to determine an aggregated ticket size score for the sector (e.g., an average or weighted average of the merchant ticket size scores for the merchants within the sector). Alternatively, the MA computing device may use the determined ticket size of each merchant in a sector to determine an aggregated ticket size score for the sector and may subsequently compare sectors. The MA computing device may then provide the (numerical) ticket size score for the sector.

In one embodiment, the MA computing device may determine a composite score for a merchant based on the growth, stability, size, traffic, and/or ticket size score for the merchant. The composite score may be an average of all five scores, may be a weighted average of all five scores, or may be any other combination or aggregation of the five scores for the merchant location and/or the online transactions located in the sector. The composite score for a sector may be an average of all five scores, may be a weighted average of all five scores, or may be any other combination or aggregation of the five scores for the sector (e.g., an average or weighted average of the merchant composite scores for the merchants within the sector). Alternatively, the composite score for a sector may be an average, weighted average, or any other aggregation of the composite scores of the merchants in the sector. The composite score is intended to be an "at-a-glance" ranking of the relative success of the sector, taken as a function of the five identified characteristics that may reflect the success of a business.

In the example embodiment, the MA computing device is configured to selectively generate and/or present merchant analytics based on transactions initiated at a merchant location, online transactions, or a combination of merchant location transactions and online transactions. A user of the MA computing device may select what type of transactions for the MA computing device to generate the merchant analytics. In the example embodiment, the MA computing device generates merchant analytics for each type and selectively presents the merchant analytics based on user input. To combine transactions initiated at a merchant location and online transactions, the MA computing device may use all transactions at a merchant location and online transactions associated with a merchant in a sector to generate the merchant analytics. In some embodiments, the MA computing device adjusts the sectors. For example, the MA computing device may adjust the sectors such that online transactions are associated with the nearest merchant location.

In some embodiments, the MA computing device may be configured to generate and store merchant analytics for a merchant and/or a sector over multiple periods of time. For example, the MA computing device may initially generate a score based on data having timestamps from Jun. 1, 2013-Jun. 1, 2014 and may store that score as Score 1. The MA computing device may then generate a score based on data having timestamps from Jul. 1, 2013-Jul. 1, 2014, and may store that score as Score 2. The MA computing device may store N scores (or any other analytics) for a merchant and/or a sector, wherein N is an integer greater than one. Accordingly, the MA computing device may store a time series of scores (or any other analytics) for a merchant and/or a sector, which collects all N scores for the merchant and/or the sector sequentially (i.e., in order of time, from oldest to newest).

In one embodiment, the MA computing device may update a portfolio record with any or all of the analytics for a merchant and/or any or all aggregated merchant analytics for a sector in which the merchant and/or online transactions associated with the merchant are located. The MA computing device may be configured to determine analytics for the portfolio as a whole, using the generated analytics for each merchant in the portfolio and/or each corresponding sector. The MA computing device may be further configured to sort the merchants in a portfolio based on the investment goals for the portfolio. For example, if an investment goal identifies growth as a priority, the MA computing device may sort the merchant records in the portfolio record according to highest growth score. If there are no investment goals or if there are conflicting investment goals, the MA computing device may sort the merchant records in the portfolio according to highest composite score.

Optimization Phase

The system is also configured to facilitate optimization of portfolios in an "Optimization Phase." In one example, the system is configured to sort the merchant records in the portfolio according to the investment goals of a user. As described briefly above, some users may be responsible for or otherwise interested in a distribution of a marketing budget according to the investment goals, in some cases prioritizing growth or traffic or stability, as desired. If the user (a CMO, in this example, for illustrative purposes only) has a specific, predetermined budget and predetermined investment goals, the system may enable the CMO to distribute the budget based on the evaluation of all of the merchants in the CMO's portfolio. If, for example, the CMO chose to prioritize growth in his/her investment goals for his/her associated business, the system may sort the merchant location records in the portfolio from highest growth score to lowest growth score and may present the results as a list. In some implementations, the CMO may import more specific investment goals to the system. For example, the CMO may indicate that 15% of his/her budget is to be spent on the top 5% of merchants in the portfolio with the highest growth. The next 15% is to be spent on the 10% of merchants with the next-highest growth. The next 10% is to be spent on the 10% of the merchants with the next-highest growth, and so on and so forth. The system may use these specific investment goals and output an optimized portfolio record that divides the merchant records into the desired percentiles.

In another example, the system is configured to provide recommendations for new locations for merchants using existing merchant records in a portfolio. In this example, a user (a real estate broker, for illustrative purposes only) may have received an offer from a merchant to rent (or lease) a merchant location (e.g., a property or a portion of a property). The merchant may have a particular sector in mind, or may have indicated in the offer that he/she desires a merchant location having certain specifications (e.g., a merchant location in a high-traffic sector). The real estate broker may import the specifications into the system, which may output an optimized portfolio to the real estate broker including sector records of sectors including available merchant locations having the specifications. Alternatively, the real estate broker may use the system to locate and/or suggest a sector other than the particular sector identified in the offer, by illustrating (using a user interface provided by the system) higher performance (e.g., higher traffic or higher growth) in a different sector. In another related example, the real estate broker may have an existing client complaining of poor performance at his/her merchant location. The real estate broker may illustrate (using the user interface provided by the system) slowing growth or traffic trends in the client's current sector, and may suggest relocation to a sector with higher recent performance. In another example, a marking firm may have a client requesting support to increase the client's ecommerce or transportation business online. The marketing firm may use the system described herein to suggest to the client to prioritize particular sectors for online marketing.

User Interface

The MA computing device is further configured to facilitate the display of an interactive graphical user interface (UI). The UI may be displayed on a user computing device of a user. The UI is configured such that the user may easily view aggregated merchant analytics for a sector and/or for a particular industry, for example, as a graphical representation displayed on a map. In one embodiment, the UI is populated with data that is updated on a monthly basis, however, in other embodiments, the UI may be populated with data updated at any other interval (e.g., weekly, daily, etc.).

In the example embodiment, the user may search by location to find a geographic region (e.g., state, city, zip code, zip+4, county, neighborhood) in which the user is interested. The UI displays the geographic location divided into defined sectors. In some embodiments, the UI enables a user to "zoom in" and "zoom out" on the view. Zooming in may provide a view of the sectors at a more granular level. Zooming out may provide a view of sectors aggregated into larger geographic regions, for example, by city, county, or state. In the example embodiment, displayed sectors are colored or shaded according to the strength of generated merchant analytics, wherein a darker or more saturated color or shade indicates stronger analytics (e.g., more successful sectors). Accordingly, the user may easily discern sectors with stronger analytics, with only a single glance. In other embodiments, lighter colors may indicate stronger analytics. In still other embodiments, the sectors may not be colored or shaded at all.

As will be described further herein, the UI may provide user an option to view sectors according to different metrics (e.g., according to the various scores described above included within the merchant analytics). The UI may also allow the user to switch between a "street map" view, in which the divisions of defined sectors are overlaid upon a traditional street map, and a "satellite view", in which the defined sectors are overlaid upon satellite imagery of the geographic region. Accordingly, depending on the view, users may be able to more easily understand the delineations between sectors and the geographical advantages that may serve certain sectors over others. In addition, as will be described further herein, the UI may provide other tools to the user for navigation of the merchant analytics and for a "deeper dive" into the granularity of the analytics.

Through the monitoring of commercial real estate and online marketing portfolios, the systems and methods are further configured to facilitate (a) determining an originating or initiating location for online transactions; (b) identifying physical merchant locations associated with online transactions for digital wallet purchases; (c) integration of transaction data for transactions at merchant locations and online transactions into the generation of merchant analytics by linking transaction data received from interchange networks (or payment networks) to such analytics, (d) improvement of the visualization of sector value or success, relative to other sectors and over time, and (e) optimization of investment by using objective evaluations of relative success of certain sectors and/or merchants over others.

The technical effects of the systems and methods described herein can be achieved by performing at least one of the following steps: (i) defining a plurality of sectors of a geographic region; (ii) receiving transaction data for transactions occurring within the geographic region and a period of time, the transaction data associated with a plurality of merchants; (iii) determining if the transaction data is associated with an online transaction and generate a transaction location identifier that indicates a location associated with a merchant of the plurality of merchants or a cardholder; (iv) identifying one sector of the plurality of sectors in which a transaction for each merchant of the plurality of merchants is located based on the transaction location identifier; (v) generating aggregated merchant analytics for each sector based on the transaction data associated with transactions located in the sector of each merchant of the plurality of merchants relative to all other sectors of the plurality of sectors; and (vi) causing to be displayed on a user interface of a user computing device the aggregated merchant analytics, wherein the aggregated merchant analytics are graphically represented on a map of the defined sectors.

The following detailed description of the embodiments of the disclosure refers to the accompanying drawings. The same reference numbers in different drawings may identify the same or similar elements. Also, the following detailed description does not limit the claims.

Described herein are computer systems such as MA computing devices and user computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to the generation and communication (e.g., display) of aggregate merchant valuation analytics.

FIG. 1 is a schematic diagram illustrating an example multi-party payment card system 20 for enabling payment-by-card transactions and communicating aggregated merchant analytics for a sector, in accordance with one embodiment of the present disclosure. FIG. 1 depicts a flow of data in a typical financial transaction through system 20, which includes a merchant analysis computing device 112. Components of system 20 provide merchant analysis computing device 112 with transaction data, which merchant analysis computing device 112 processes to generate merchant analytics and provide the analytics on a user interface.

Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. Cardholder 22 may purchase goods and services ("products") at merchant 24. Cardholder 22 may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card or virtual transaction card, merchant 24 requests authorization from a merchant bank 26 for the amount of the purchase. The request may be performed over the telephone or electronically, but is usually performed through the use of a point-of-sale terminal, which reads cardholder's 22 account information from a magnetic stripe, a chip, or embossed characters on the transaction card and communicates electronically with the transaction processing computers of merchant bank 26. Merchant 24 receives cardholder's 22 account information as provided by cardholder 22. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. In the example embodiment, transaction data including such additional transaction data may also be provided to systems including MA computing device 112. In the example embodiment, interchange network 28 provides such transaction data (including merchant data associated with merchant tenants of each commercial real estate asset of each portfolio record) and additional transaction data. In alternative embodiments, any party may provide such data to MA computing device 112.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described below in more detail, MA computing device 112 may be used to generate and communicate aggregated merchant analytics. Although the systems described herein are not intended to be limited to facilitate such applications, the systems are described as such for exemplary purposes.

Figure 2:
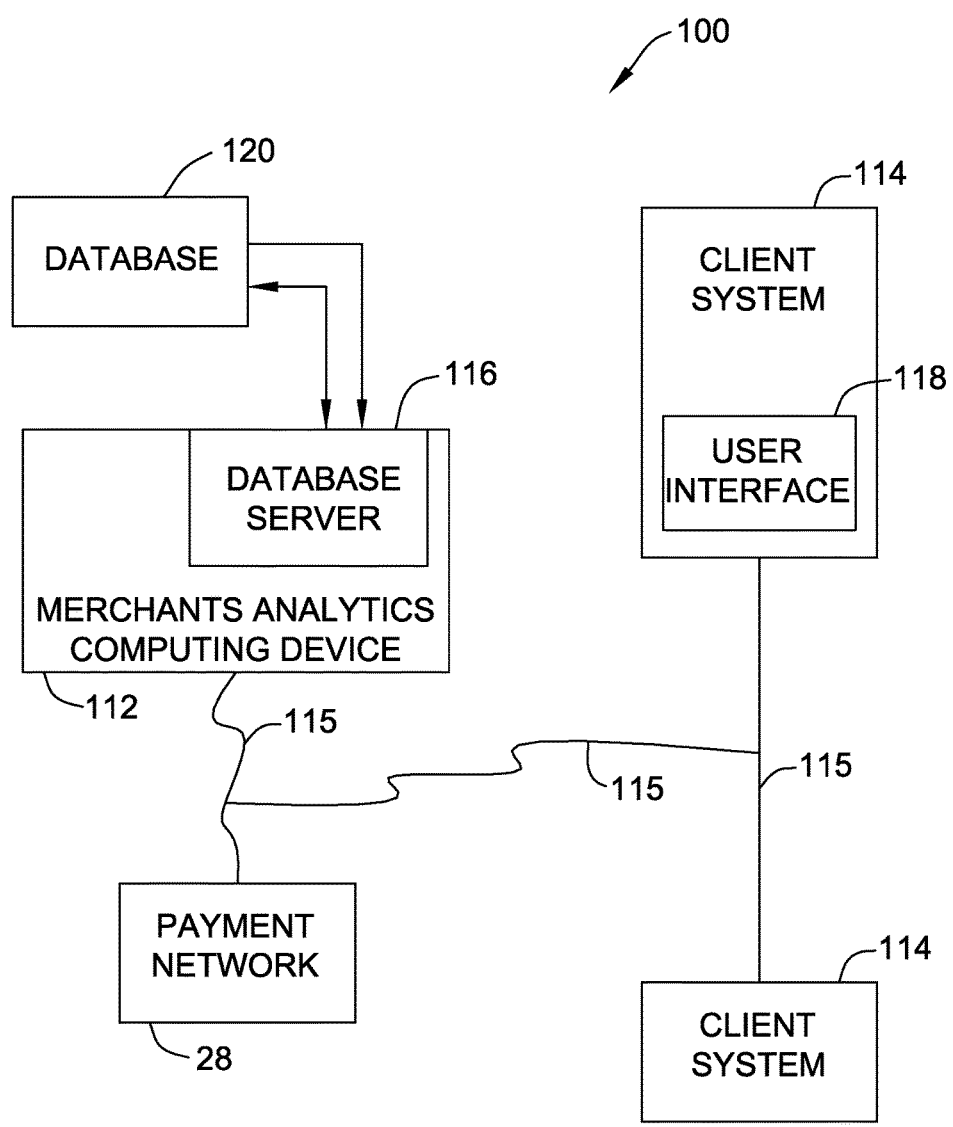

FIG. 2 is an expanded block diagram of an example embodiment of a computer system 100 used in processing payment transactions that includes MA computing device 112 in accordance with one example embodiment of the present disclosure. In the example embodiment, system 100 is used for generating merchant analytics and displaying said analytics on a user interface, as described herein.

More specifically, in the example embodiment, system 100 includes a MA computing device 112, and a plurality of client sub-systems, also referred to as client systems 114, connected to MA computing device 112. In one embodiment, client systems 114 are computers including a web browser, such that MA computing device 112 is accessible to client systems 114 using the Internet and/or using network 115. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 may include systems associated with cardholders 22 (shown in FIG. 1) as well as external systems used to store data. MA computing device 112 is also in communication with payment network 28 using network 115. Further, client systems 114 may additionally communicate with payment network 28 using network 115. Client systems 114 could be any device capable of interconnecting to the Internet including a web-based phone, PDA, or other web-based connectable equipment.

A database server 116 is connected to database 120, which contains information on a variety of matters, as described below in greater detail. In one embodiment, centralized database 120 is stored on MA computing device 112 and can be accessed by potential users at one of client systems 114 by logging onto MA computing device 112 through one of client systems 114. In an alternative embodiment, database 120 is stored remotely from MA computing device 112 and may be non-centralized. Database 120 may be a database configured to store information used by MA computing device 112 including, for example, transaction data, cardholder computing device data, defined sectors, merchant definitions, user data, portfolio records, merchant scores, and sector scores.

Database 120 may include a single database having separated sections or partitions, or may include multiple databases, each being separate from each other. Database 120 may store transaction data generated over the processing network including data relating to merchants, consumers, account holders, prospective customers, issuers, acquirers, and/or purchases made. Database 120 may also store account data including at least one of a cardholder name, a cardholder address, an account number, other account identifiers, and transaction information. Database 120 may also store merchant information including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, one of client systems 114 may be associated with one of acquirer bank 26 (shown in FIG. 1) and issuer bank 30 (also shown in FIG. 1). For example, one of client systems 114 may be a POS device. Client systems 114 may additionally or alternatively be associated with a user (e.g., a commercial real estate owner or lender, a marketing director, a consumer, or any other end user). In the example embodiment, one of client systems 114 includes a user interface 118. For example, user interface 118 may include a graphical user interface with interactive functionality, such that aggregated merchant analytics, transmitted from MA computing device 112 to client system 114, may be shown in a graphical format. A user of client system 114 may interact with user interface 118 to view, explore, and otherwise interact with the merchant analytics. MA computing device 112 may be associated with interchange network 28 and/or may process transaction data.

Figure 3:
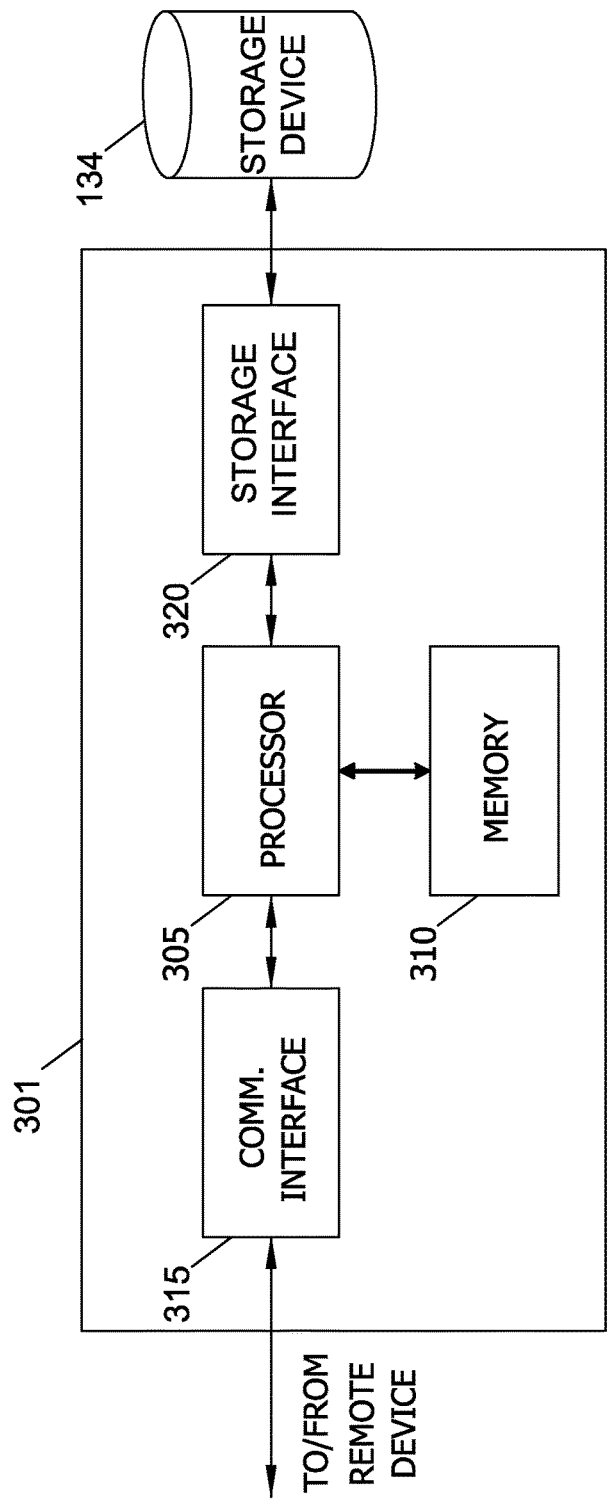

FIG. 3 illustrates an example configuration of a server system 301 such as MA computing device 112 (shown in FIGS. 2 and 3) used to generate merchant analytics and present said analytics on an interactive user interface, in accordance with one example embodiment of the present disclosure. Server system 301 may also include, but is not limited to, database server 116. In the example embodiment, server system 301 determines and analyzes characteristics of devices used in payment transactions, as described below.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests (e.g., requests to display merchant analytics and/or provide an interactive user interface) from a client system 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
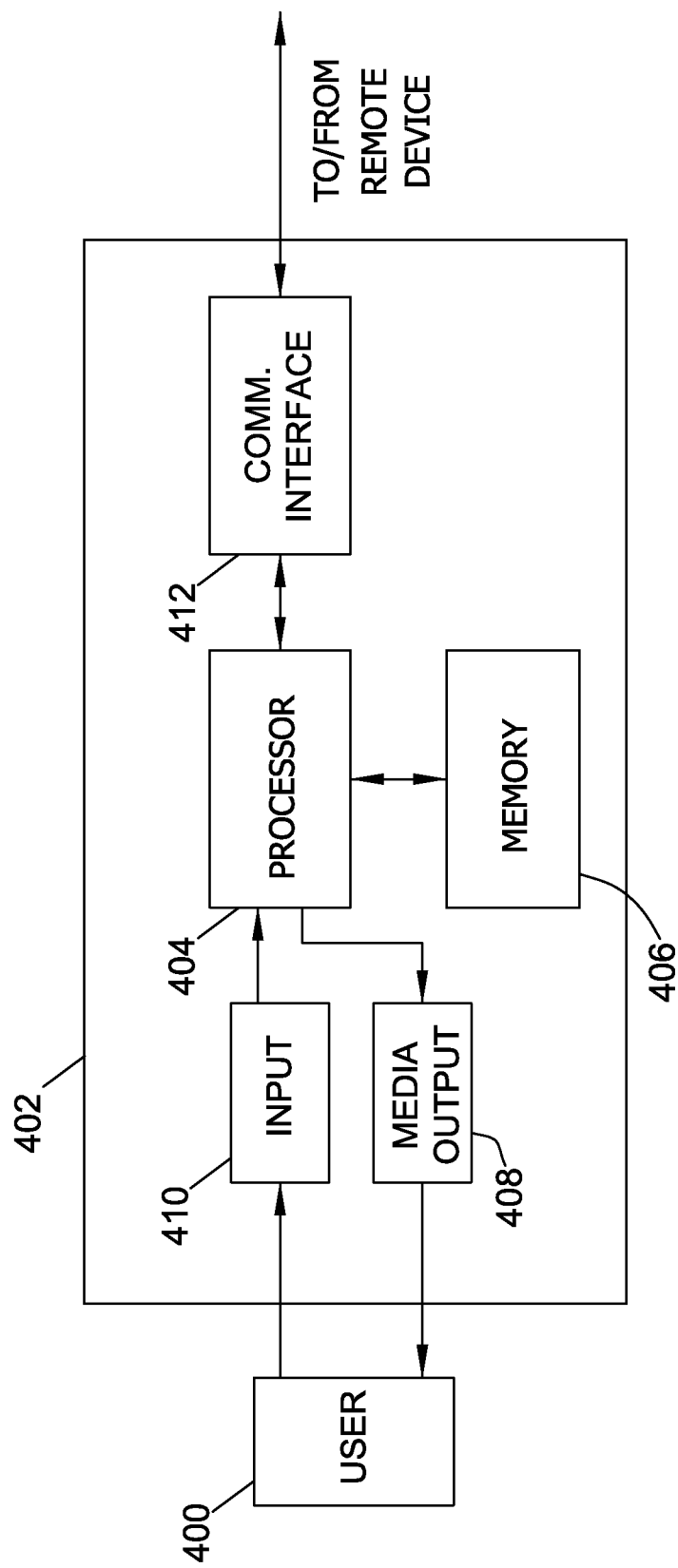

FIG. 4 illustrates an example configuration of a client computing device 402. Client computing device 402 may include, but is not limited to, client systems ("client computing devices") 114. Client computing device 402 includes a processor 404 for executing instructions. In some embodiments, executable instructions are stored in a memory area 406. Processor 404 may include one or more processing units (e.g., in a multi-core configuration). Memory area 406 is any device allowing information such as executable instructions and/or other data to be stored and retrieved. Memory area 406 may include one or more computer-readable media.

Client computing device 402 also includes at least one media output component 408 for presenting information to a user 400 (e.g., a cardholder 22). Media output component 408 is any component capable of conveying information to user 400. In some embodiments, media output component 408 includes an output adapter such as a video adapter and/or an audio adapter. An output adapter is operatively coupled to processor 404 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 410 for receiving input from user 400. Input device 410 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 408 and input device 410.

Client computing device 402 may also include a communication interface 412, which is communicatively couplable to a remote device such as server system 302 or a web server operated by a merchant. Communication interface 412 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 406 are, for example, computer-readable instructions for providing a user interface to user 400 via media output component 408 and, optionally, receiving and processing input from input device 410. A user interface may include, among other possibilities, a web browser and client application. Web browsers enable users 400 to display and interact with media and other information typically embedded on a web page or a website from a web server associated with a merchant. A client application allows users 400 to interact with a server application associated with, for example, a merchant. The user interface, via one or both of a web browser and a client application, facilitates display of generated merchant analytics by MA computing device 112. The user may interact with the user interface to view and explore the merchant analytics, for example, by selecting a sector of interest using input device 410 and viewing analytics associated with that sector.

Figure 5:
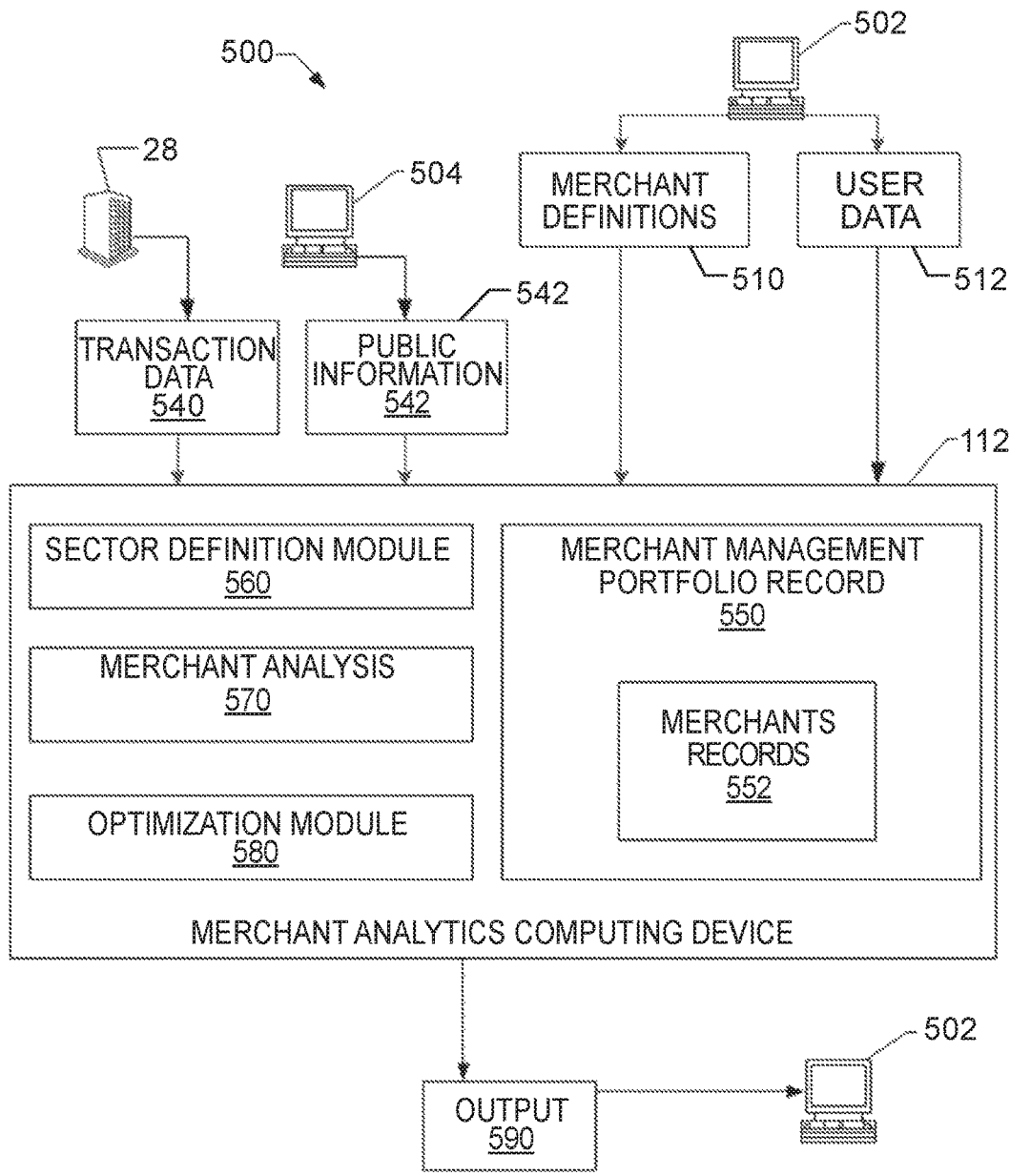

FIG. 5 is a simplified data flow diagram for generating aggregated merchant analytics for a sector, and providing the analytics for display on a user interface using MA computing device 112. As described herein, MA computing device 112 receives merchant definitions 510 and user data 512 (such as investment goals) from a user device 502 (such as a commercial lender, a commercial owner, or a marketing director). MA computing device 112 defines a plurality of merchant records 552 based on merchant definitions 510 in the Setup Phase as identified above and herein. MA computing device 112 further defines merchant management portfolio record 550 based on such merchant definitions 510.

MA computing device 112 also receives transaction data 540 associated with a plurality of merchants being analyzed. Transaction data 540 may be received from interchange network 28. Other information including census data or other public information 542 data may be received from external systems such as external server 504.

MA computing device 112 includes a plurality of modules 560, 570, and 580 that facilitate generation and display of merchant analytics. Specifically, MA computing device 112 includes sector definition module 560 configured to define sectors and identify merchants and online transactions located in each sector, as specified in the Sector Definition Phase. Sector definition module 560 may update merchant records 552 to reflect the sector in which each associated merchant and online transaction is located. MA computing device 112 also includes merchant analysis module 570 configured to generate analytics for each merchant record 552 (or for each sector in which a merchant is located) in merchant management portfolio record 550, as specified in the Evaluation Phase. MA computing device 112 also includes optimization module 580 configured to perform optimization tasks for merchant management portfolio record 550 as specified in Optimization Phase.

MA computing device 112 is also configured to provide outputs 590 as described herein. Specifically, outputs 590 may include merchant analytics for each merchant for which there is an associated merchant record 552, as well as aggregated merchant analytics for each associated sector. Outputs 590 may also include an optimized portfolio record 550, which may be sorted to identify and emphasize merchants that align with investment goals. Outputs 590 may also include any and all formatted output for display on a user interface of a user computing device (e.g., client system 114, as shown in FIG. 2).

FIGS. 6-15 are example screenshots of a user interface (e.g., user interface 118, shown in FIG. 2) of a user computing device (e.g., client system 114, also shown in FIG. 2). The example screenshots include data generated by MA computing device 112 (shown in FIG. 2) such as merchant analytics, as described herein. MA computing device 112 communicates the merchant analytics to the user device for display on interactive user interface 118.

Figure 6:
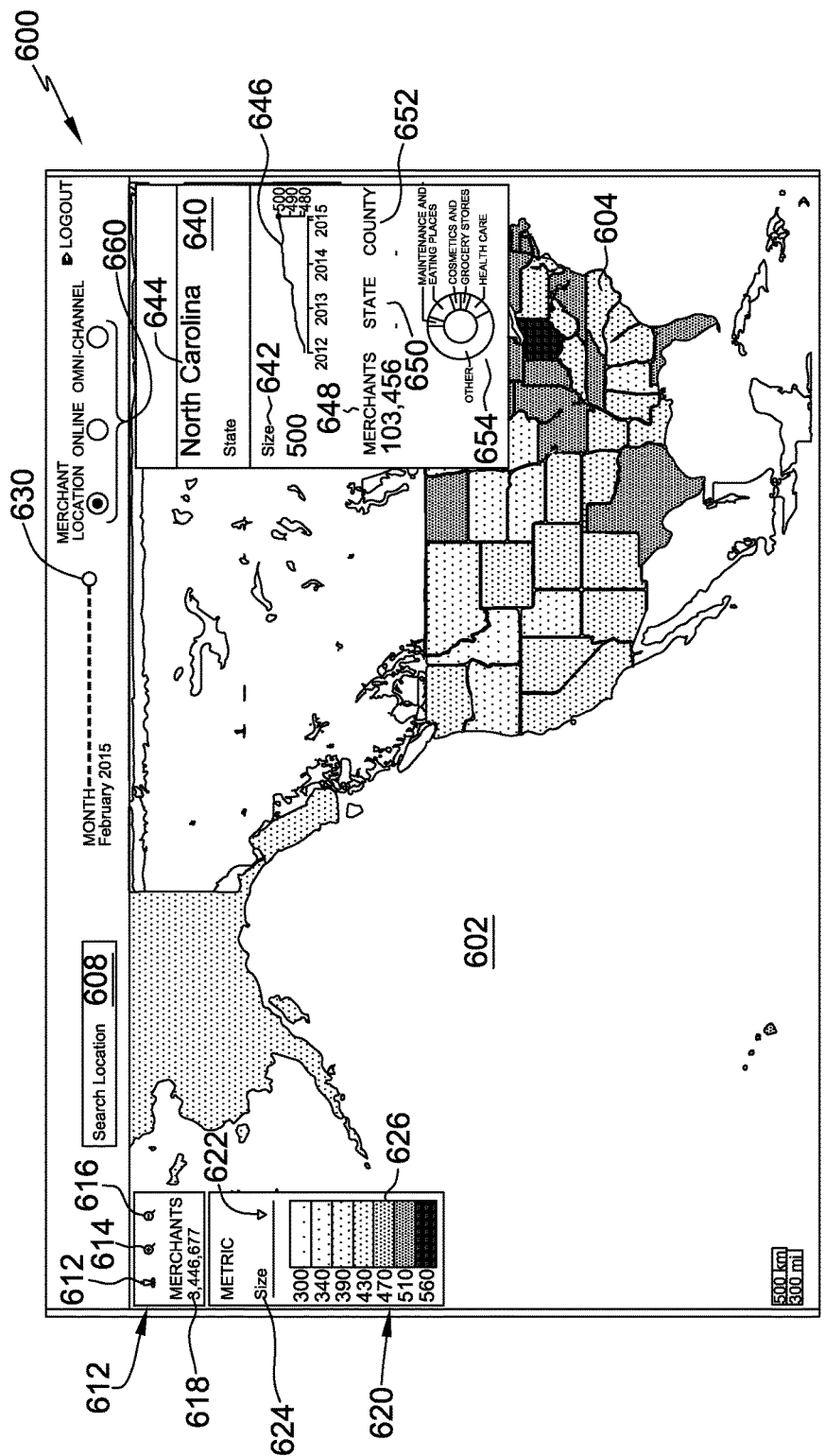
Figure 15:
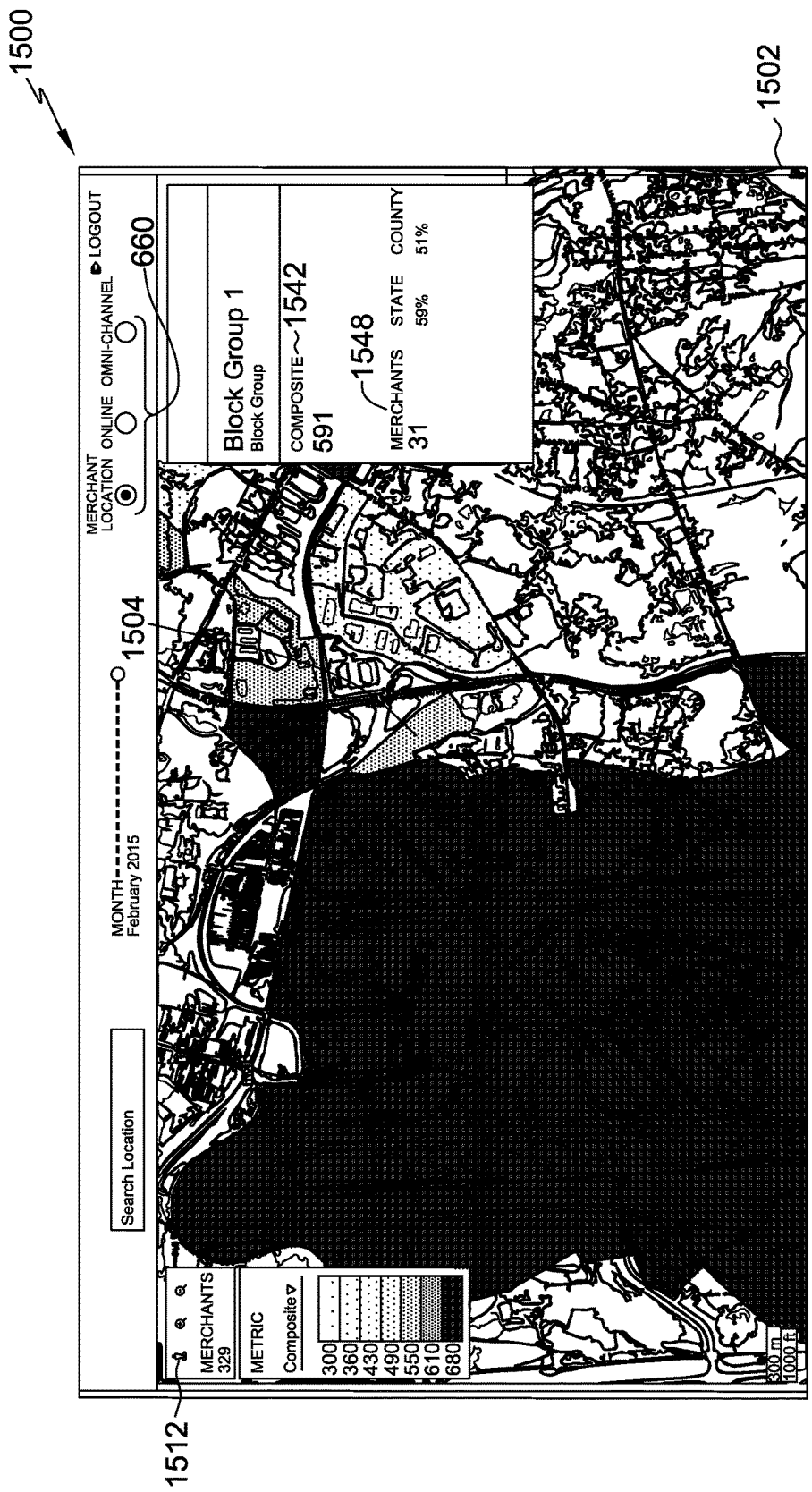

More specifically, FIG. 6 depicts a U.S.-level screenshot 600 showing a "zoomed out" view 602 of the United States of America. In view 602, the sectors are defined and displayed at a state-wide level. The screenshot 600 also includes several tools that enable a user to navigate the user interface and to examine the data generated and transmitted by MA computing device 112. For example, the screenshot 600 depicts a location search bar 608, which enables the user to search for a geographic region of interest. The screenshot 600 also includes a view navigation module 610. The view navigation module 610 includes a "view type" selectable icon 612, which enables the user to toggle between a "street map" view (as shown in view 602) and a "satellite" view (as shown in FIG. 15). The view navigation module 610 also includes "zoom out" 614 and "zoom in" 616 selectable icons. The view navigation module 610 further includes a merchant number indicator 618, which indicates the number of merchants encompassed by the current view (U.S. Pat. No. 3,446,677 in view 602).

The screenshot 600 further includes a metric information module 620. The metric information module 620 allows the user to select between available merchant analytics metrics (e.g., Composite, Growth, Stability, Size, Traffic, and Ticket Size scores) using a drop-down menu 622. In the example embodiment, the metric information module 620 further includes a score scale 626, which provides an explanation to the user of the color-coding of the sectors. The sectors displayed in view 602 are shown "painted" with colors and/or shades corresponding to the score scale 626, which visually indicates the relative score (for the selected metric 624) for each sector. When a user chooses a different metric using drop-down menu 622, the user interface will "re-paint" (i.e., re-color or re-shade) the displayed sectors (and, in some cases, the score scale 626) to reflect a range of numerical scores according to the selected metric 624. In the example embodiment, a darker color indicates a higher score. In view 602, the selected metric 624 is "Size." Accordingly, the merchant analytics provided on the user interface are size scores for selected sectors. The screenshot 600 also depicts a time-selection slider 630, which will be described further herein with respect to FIG. 14.

The screenshot 600 also depicts a "smart chart" 640, which provides the user with a score 642 for a selected sector 604, as well as additional information. In view 602, North Carolina is the selected sector 604, as indicated by the sector indicator 644 of the smart chart 640. The smart chart 640 includes, in view 602, a size score 642 for North Carolina (500 in view 602). As view 602 depicts sectors at a state level, the size score 642 for North Carolina is relative to all other states. The smart chart 640 also includes a trend graph 646, which is a visual representation of the size score trends for the selected sector 604 (North Carolina) over time. The smart chart 640 also includes its own merchant number indicator 648, which indicates the number of merchants included in the selected sector 604 (North Carolina). State and County ranking indicators 650, 652 in the current view 602, are blank, as they are not applicable to a state-level sector. State and County ranking indicators 650, 652 will be described further herein with respect to FIGS. 7 and 8. The smart chart 640 also includes an industry chart 654 (a pie chart in the illustrated embodiment), which indicates the percentage of merchant locations in the selected sector 604 associated with various industries.

The screenshot 600 also includes display mode menu 660 for selecting a display mode. In the illustrated embodiment, display mode menu 660 includes three radial buttons for selecting a display mode including a button for merchant location transactions (i.e., brick-and-mortar transactions) labeled "Merchant Locations", a button for online transactions labeled "Online", or a button for a combination of merchant location transactions and online transactions labeled "Omni-Channel". In some embodiments, display mode menu 660 may include a different number of display options and/or different labels. Display mode menu 660 may be a different type of menu, such as a drop-down menu. With reference to FIGS. 6-15, the display mode selected in each display mode menu indicates the displayed merchant analytics are associated with merchant location transactions. As described further below, the selected display mode in FIG. 16 indicates the displayed merchant analytics are associated with online transactions. The selected display mode in FIG. 17 indicates the displayed merchant analytics are associated with both merchant location transactions and online transactions. It is to be understood that, in the absence of contrary representation, a MA computing device (e.g., MA computing device 112) provides a similar user interface (e.g., user interface 118) for each display mode of display mode menu 660.

Figure 7:
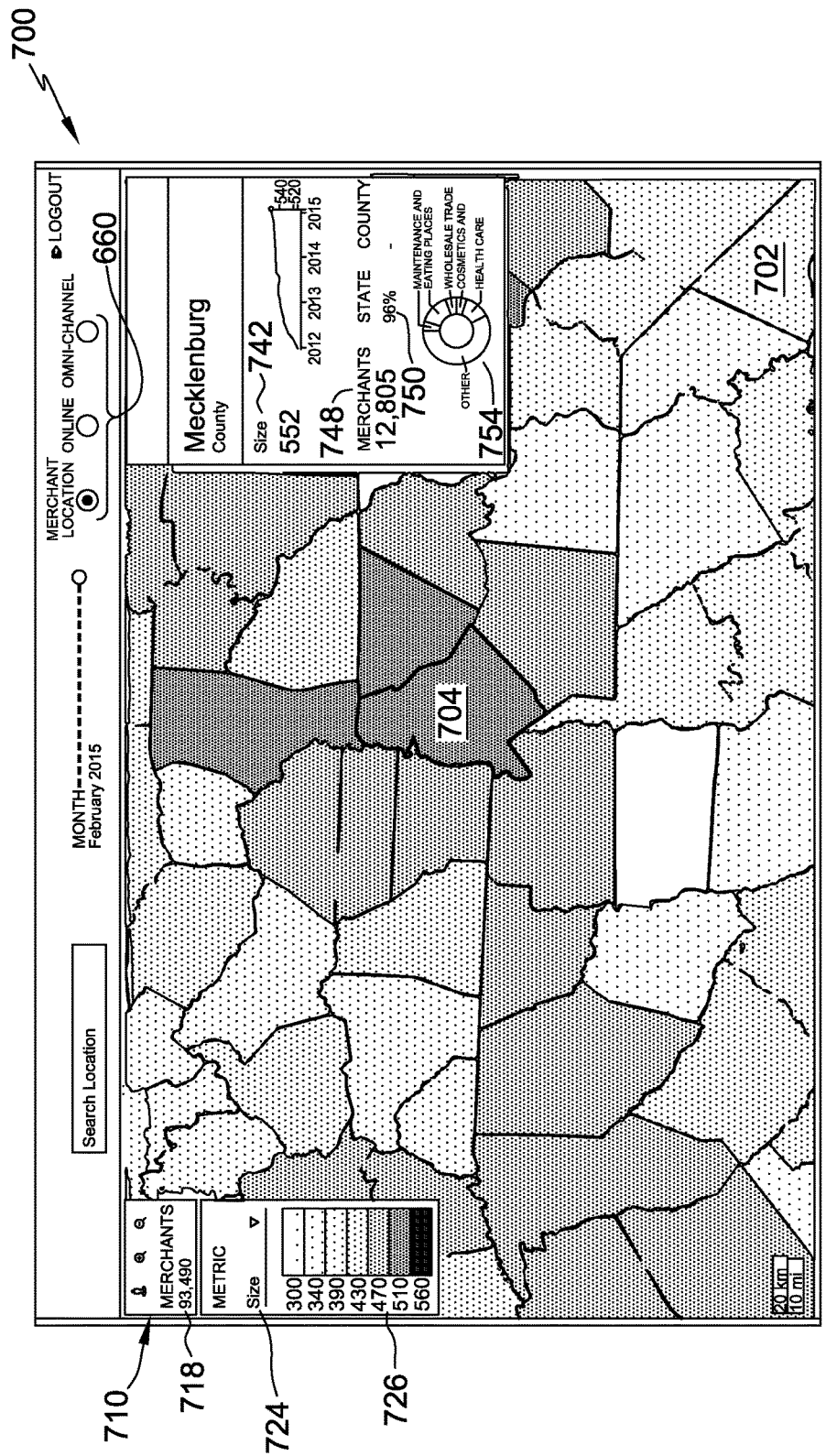

FIG. 7 depicts a screenshot 700 showing a state-level view 702 (zoomed-in relative to view 602, shown in FIG. 6). View 702 depicts the state of North Carolina divided into county-level sectors. Notably, the merchant number indicator 718 in the view navigation module 710 has changed (relative to the merchant number indicator 618 in FIG. 6), depicting 93,490 merchants encompassed by view 702. The score scale 726 has also changed (relative to score scale 626 in FIG. 6), such that the colors or shades indicate different ranges of scores.

In view 702, Mecklenburg County is the selected sector 704. Accordingly, the information in the smart chart 740 has changed to reflect the data representing Mecklenburg County. For example, the size score 742 is 552, the merchant number indicator 748 reflects a much smaller number of merchants encompassed, and the industry chart 754 has also been updated. The state ranking indicator 750 is now populated. The state ranking indicator 750 denotes the percentile of the selected sector 704 relative to all other sectors in the state. In view 702, the state ranking indicator 750 reads 96%, denoting that Mecklenburg County is in the 96$^{th}$ percentile of counties in the state, according to the selected metric 724 of "size."

Figure 8:
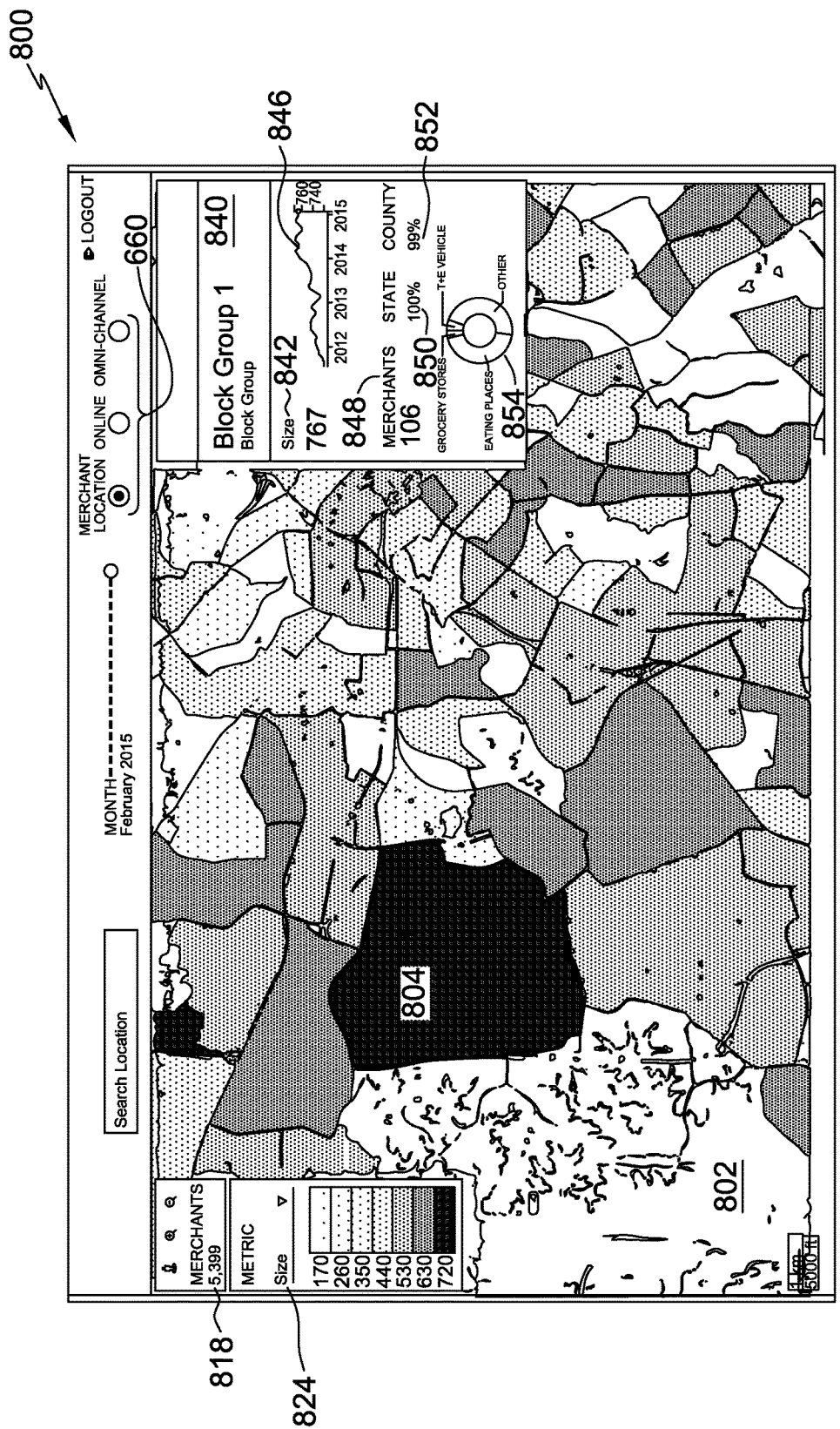

FIG. 8 depicts a screenshot 800 showing a view 802 that is zoomed-in relative to view 602 and view 702 (shown in FIGS. 6 and 7, respectively). View 802 depicts a portion of Mecklenburg County at block-group-level sectors. In view 802, "Block Group 1" is the selected sector 804. Block Group 1 includes, in this example, Charlotte-Douglas Airport (CLT). Once again, the merchant number indicator 818 has decreased, and the information in the smart chart 840 has changed. The size score 842 (now 767), trend graph 846, merchant number indicator 848, state ranking indicator 850, and industry chart 854 reflect data representative of Block Group 1. Moreover, the county ranking indicator 852 is now populated. The county ranking indicator 852 denotes the percentile of the selected sector 804 relative to all sectors in the county. In view 802, the county ranking indicator 852 reads 99%, denoting that Block Group 1 is in the 99$^{th}$ percentile of block-group-level sectors in the county, according to the selected metric 824 of "size."

Figure 9:
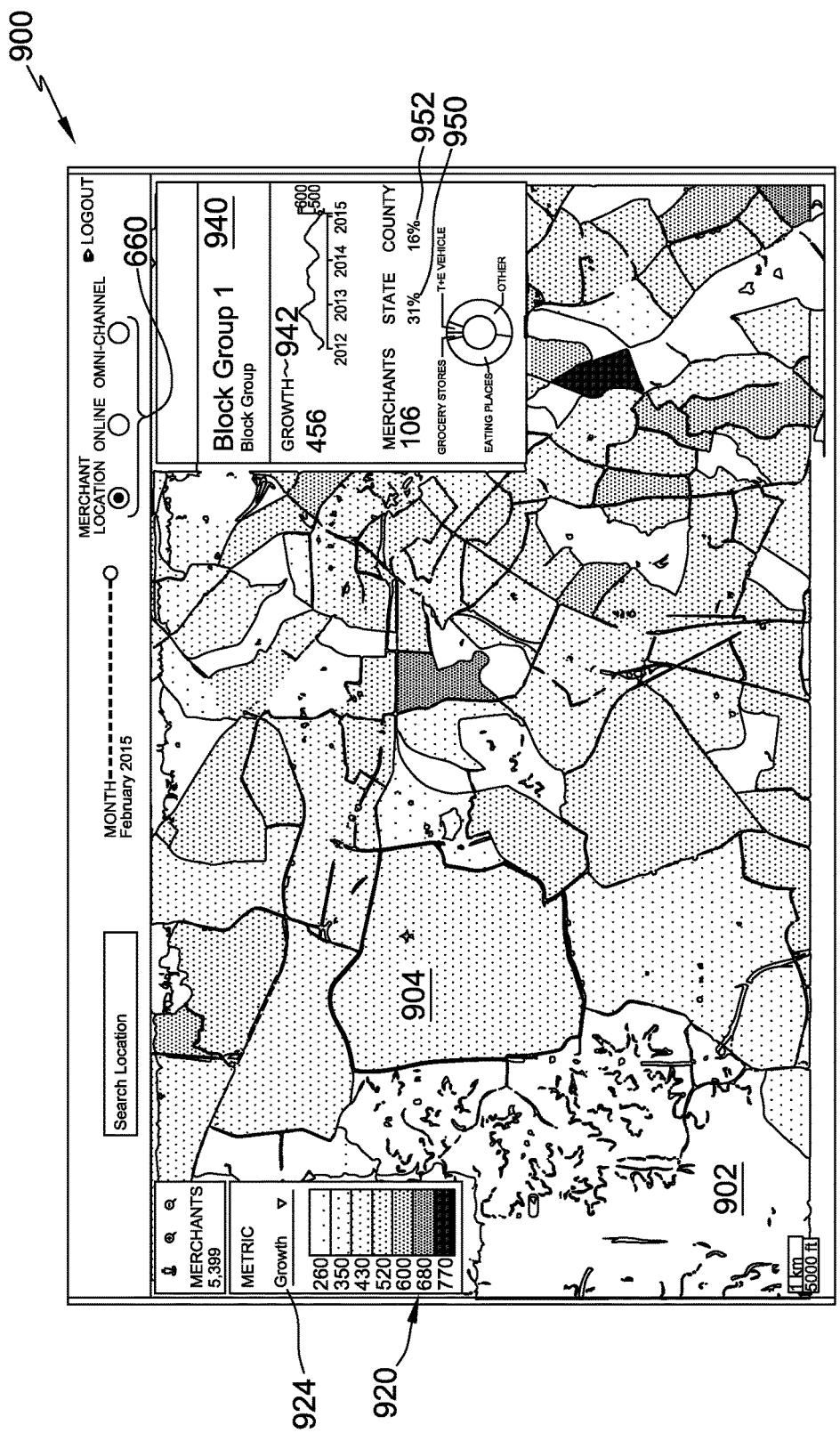

FIG. 9 depicts a screenshot 900 showing a view 902 that is the same in geographical scale as view 802 (shown in FIG. 8). However, view 902 has substantially changed in terms of the shading of the sectors. The metric information module 920 shows the selected metric 924 is the merchant analytic of "Growth," thus the sectors have been "re-painted" or "re-shaded" to reflect the growth scores of the visible sectors. The smart chart 940 for selected sector 904 Block Group 1 shows that the growth score 942 for Block Group 1 is 456, and the state and county ranking indicators 950, 952 have substantially decreased (relative to state and county ranking indicators 850, 852 shown in FIG. 8). As Block Group 1 includes CLT, it follows that the growth score 942 would be lower than the size score 842 (shown in FIG. 8). Though airports may have very high sales revenue (size) due to the sheer number of people passing through every day, their growth may be low, as the number of people travelling (and therefore the amount of money spent at airports) may not substantially increase from year to year.

Figure 10:
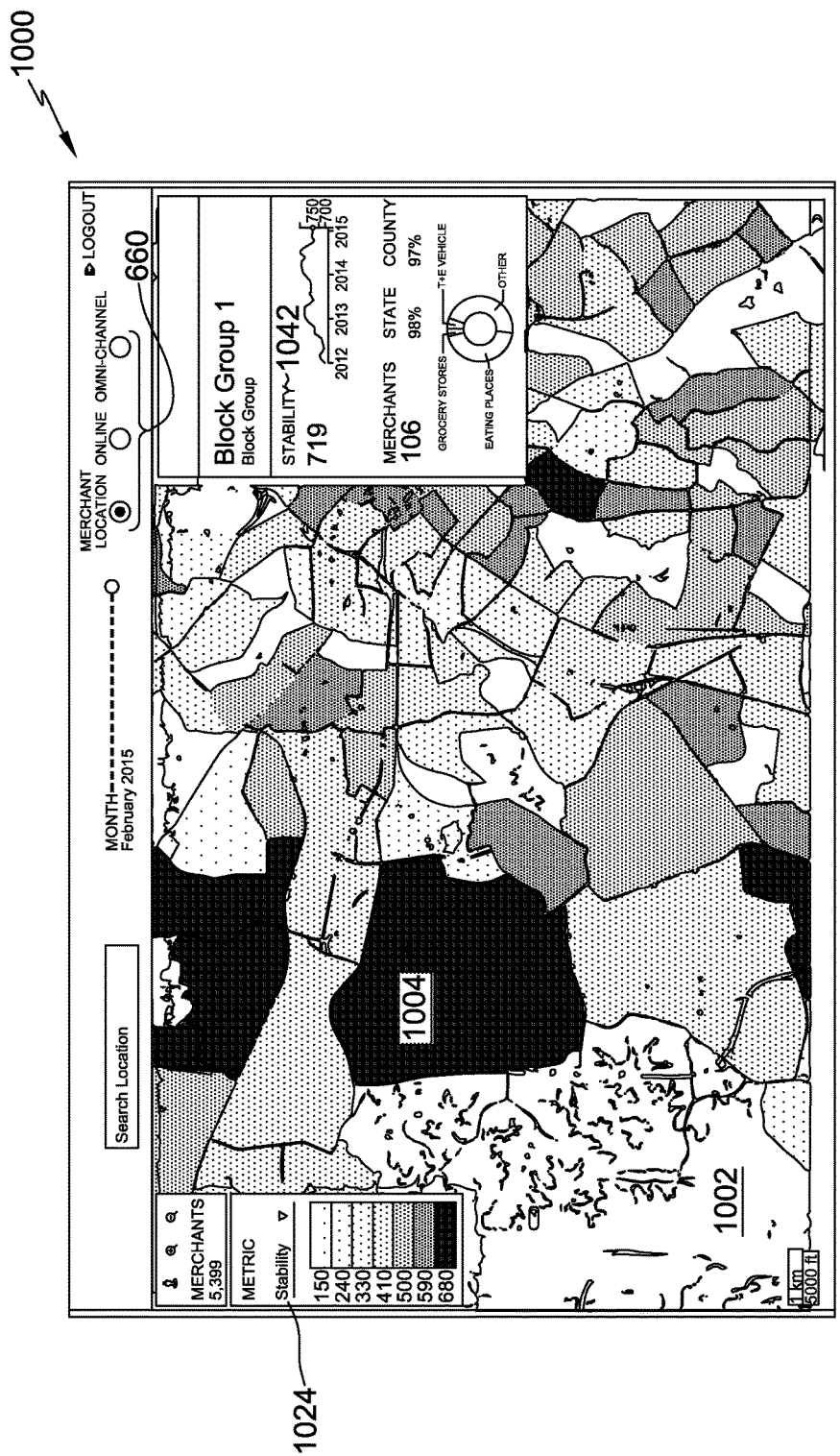

FIG. 10 depicts a screenshot 1000 showing a view 1002 that is the same in geographical scale as views 802 and 902 (shown in FIGS. 8 and 9, respectively). However, again, view 1002 shows different shading of sectors than in FIG. 8 or 9. View 1002 reflects the selected metric 1024, the merchant analytic of "Stability." The selected sector 1004 Block Group 1 has a high stability score 1042 of 719, and also ranks highly relative to sectors in the state and county. Again, considering that Block Group 1 includes CLT, it stands to reason that sales revenue may be relatively stable, as the amount of people travelling (and therefore the amount of money spent at airports) may not substantially fluctuate from year to year.

Figure 11:
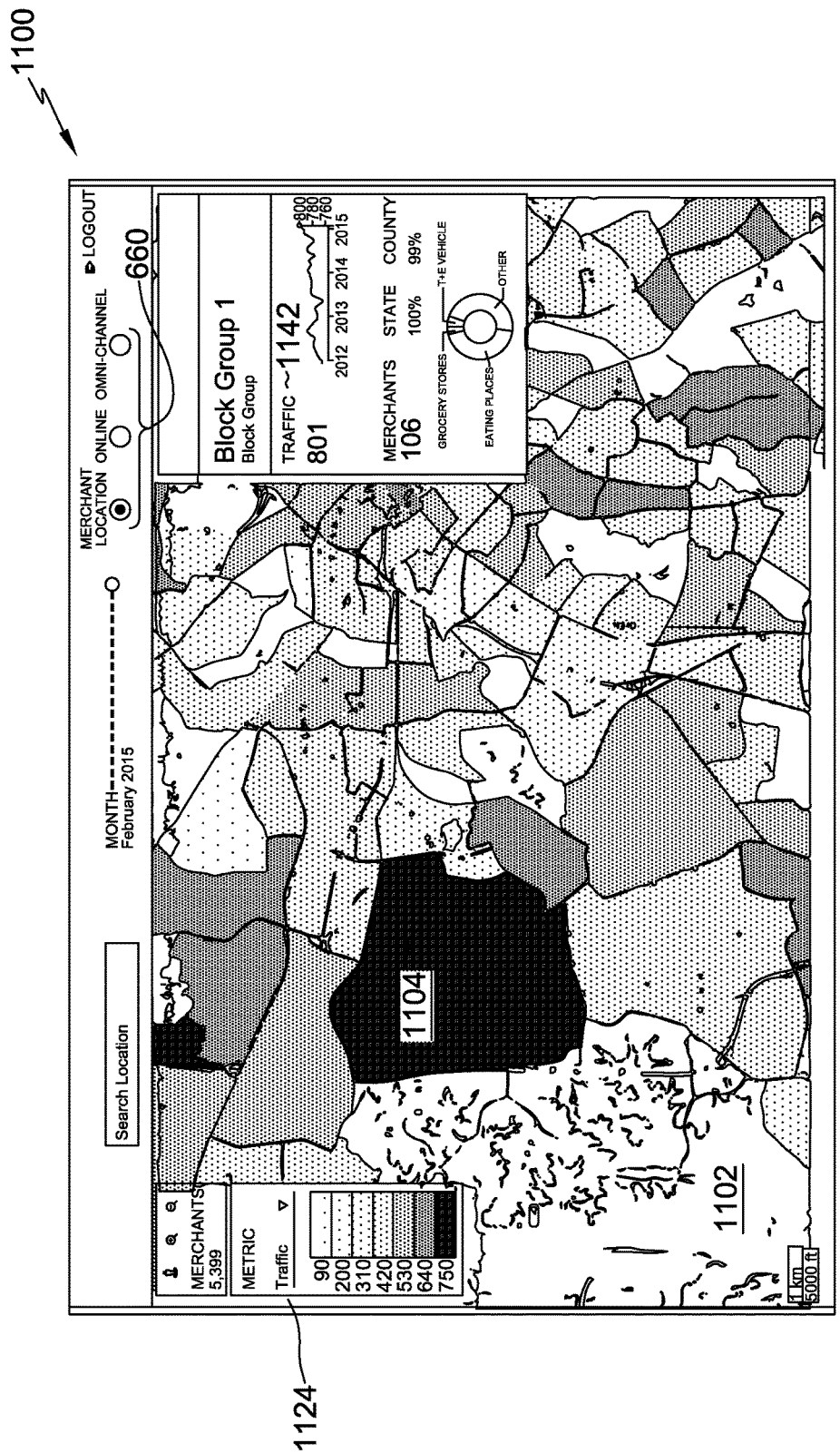

FIG. 11 depicts a screenshot 1100 showing a view 1102 that is the same in geographical scale as views 802, 902, and 1002 (shown in FIGS. 8, 9, and 10, respectively). View 1102 reflects the selected metric 1124, the merchant analytic of "Traffic." The selected sector 1104 Block Group 1 has a very high traffic score 1142 of 801, and again ranks very highly relative to sectors in the state and county. Considering the number of people travelling through airports (such as CLT) each day, and hence each years, it follows that the transaction traffic may be very high, compared to other sectors in the same geographic region.

Figure 12:
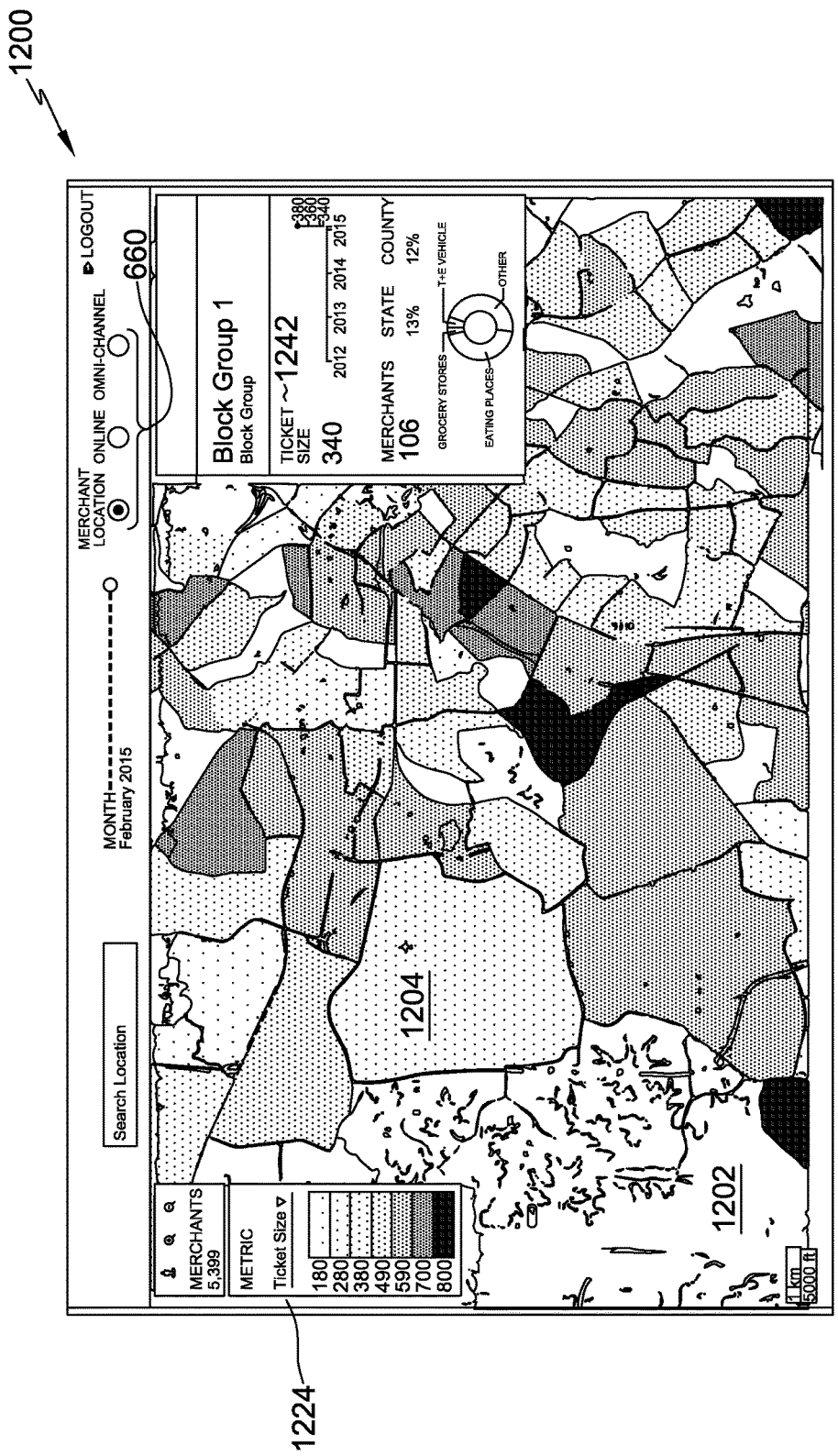

FIG. 12 depicts a screenshot 1200 showing a view 1202 that is the same in geographical scale as views 802, 902, 1002, and 1102 (shown in FIGS. 8, 9, 10, and 11, respectively). View 1202 reflects the selected metric 1224, the merchant analytic of "Ticket Size." Selected sector 1204 Block Group 1 has a very low ticket size score 1242 of 340 and ranks low relative to sectors in the state and county, despite Block Group 1 having a high numerical size score 842 (shown in FIG. 8) and a high numerical traffic score 1142 (shown in FIG. 11). Many transactions initiated in an airport (such as CLT) may be purchases of food and beverages by travelers, which may have relatively small ticket sizes (as opposed to, say, a jewelry store).

Figure 13:
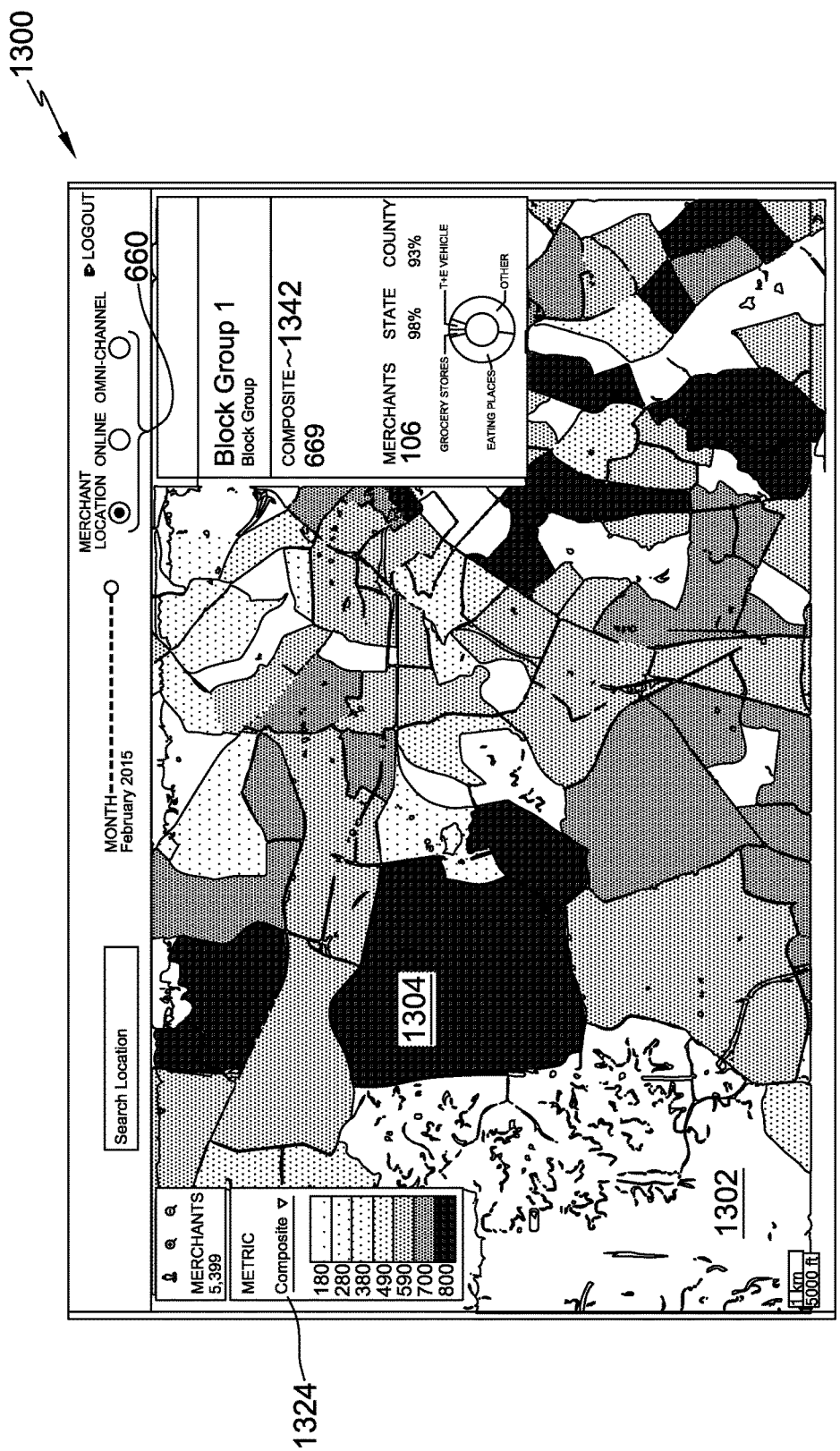

FIG. 13 depicts a screenshot 1300 showing a view 1302 that is the same in geographic scale as views 802, 902, 1002, 1102, and 1202 (shown in FIGS. 8, 9, 10, 11, and 12, respectively). View 1302 reflects the selected metric 1324, the merchant analytic of "Composite" (e.g., aggregated score). As described above, the composite score for a sector may be an average, weighted average, or some other aggregation of the other five scores for that sector. The selected sector 1304 Block Group 1 has a fairly high composite score 1342 of 669, which may be expected, considering three of the five previous scores were high for Block Group 1.

Figure 14:
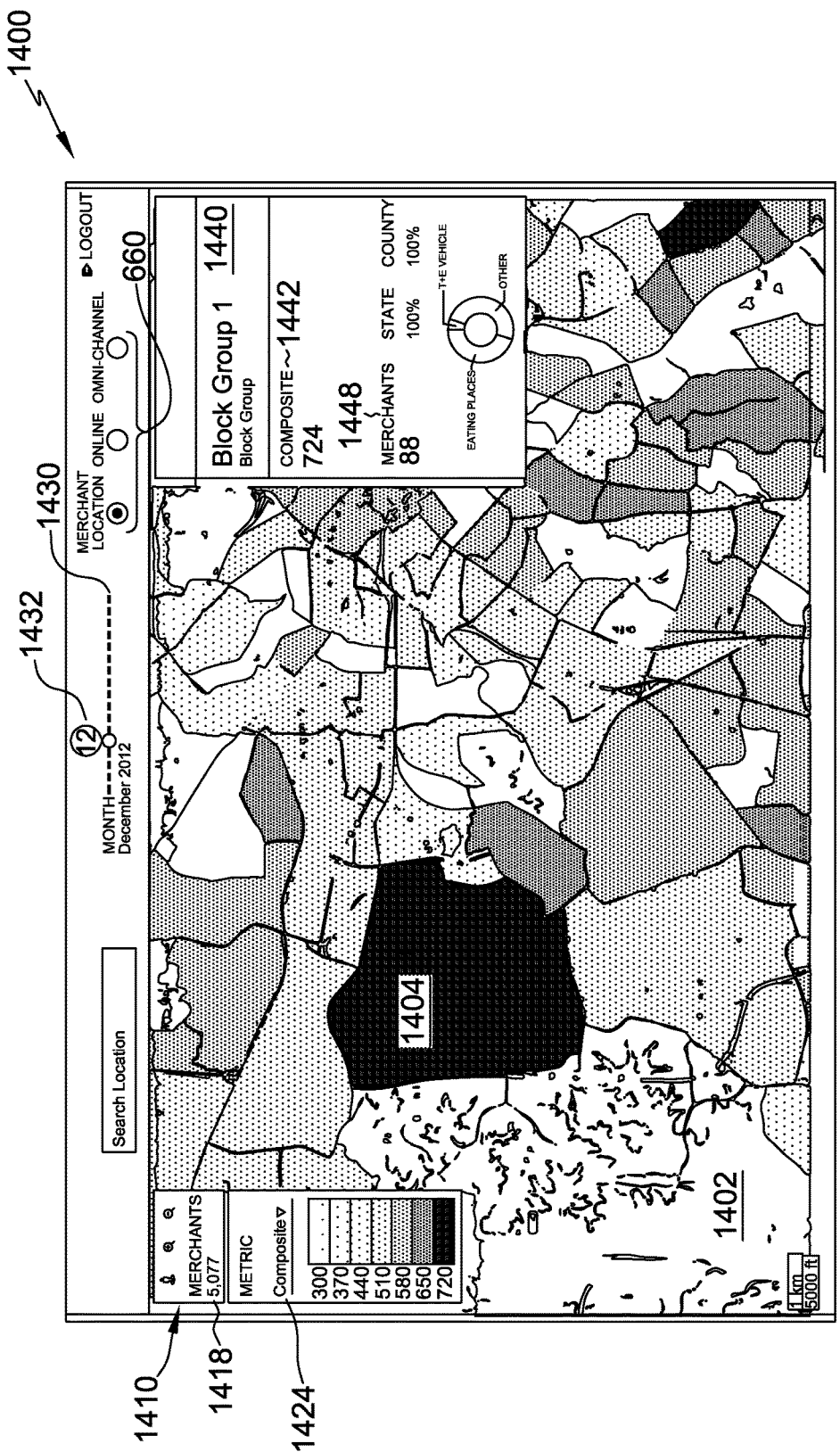

FIG. 14 depicts a screenshot 1400 showing a view 1402 that is same in geographical scale as views 802, 902, 1002, 1102, 1202, and 1302 (shown in FIGS. 8, 9, 10, 11, 12, and 13, respectively). Moreover, the selected metric 1424, as in view 1302, is "Composite." However, it should be noted that the time-selection slider 1430 has been moved from February 2015 (as was selected in all previous views) to December 2012. The time-selection slider 1430 acts as a virtual "time machine," allowing a user to see how the score for a sector has developed (i.e., increased or decreased) over time by dragging the slider 1430 from one point to another. In the example embodiment, the time-selection slider 1430 includes an interval indicator 1432, which denotes the number of months' worth of transaction data used to determine the scores shown in that particular view. The interval indicator 1432 in view 1402 reads "12," indicating that 12-months' worth of data is included in the determined scores shown. In view 1402, one can see that the merchant number indicators of merchants 1418, 1448 have decreased, both in the view navigation module 1410 and in the smart chart 1440 for the selected sector 1404 (Block Group 1).

This immediately informs the user that, from December 2012 to February 2015, the geographic area has experienced some manner of growth, as more merchant locations were present in February 2015 than December 2012, in the same geographic view. The composite score 1442 for Block Group 1 has also changed, indicating that the composite score 1342, 1442 for Block Group 1 decreased from December 2012 to February 2015. This may indicate that the selected sector 1404 is not performing as well relative to itself in December 2012, or may indicate that other sectors are performing better, relative to the selected sector 1404 (or some combination of the two scenarios). In some embodiments, some sectors may "disappear," the further back in time the user goes on the user interface by moving slider 1430 "back in time," as at that selected month (or other point in time), there was not twelve-months' worth (or any other minimum amount) of data yet for enough merchant locations to define or establish a sector at that geographic location.

FIG. 15 depicts a screenshot 1500 showing a view 1502 that is zoomed-in relative to views 802-1402 (shown in FIGS. 8-14). In view 1502, the user has toggled a "satellite" view by selecting "view type" icon 1512. Accordingly, the sectors are displayed overlaid upon satellite imagery of the geographic region. In some cases, such a view may help a user understand and visualize the boundaries of and between defined sectors. In addition, the defined sectors are at the block level. The selected sector 1504 is denoted as "Block 1001," which was included in the "Block Group 1" (block-group level) sector shown in FIGS. 8-14. Accordingly, the number of merchants included in the selected sector 1504 is reduced (relative to the number of merchants in, for example, selected sector 1404 shown in FIG. 14), as shown in the merchant number indicator 1548, and the various analytics (e.g., Composite score 1542, in this example) are determined using data for the merchants in just that block sector.

Figure 16:
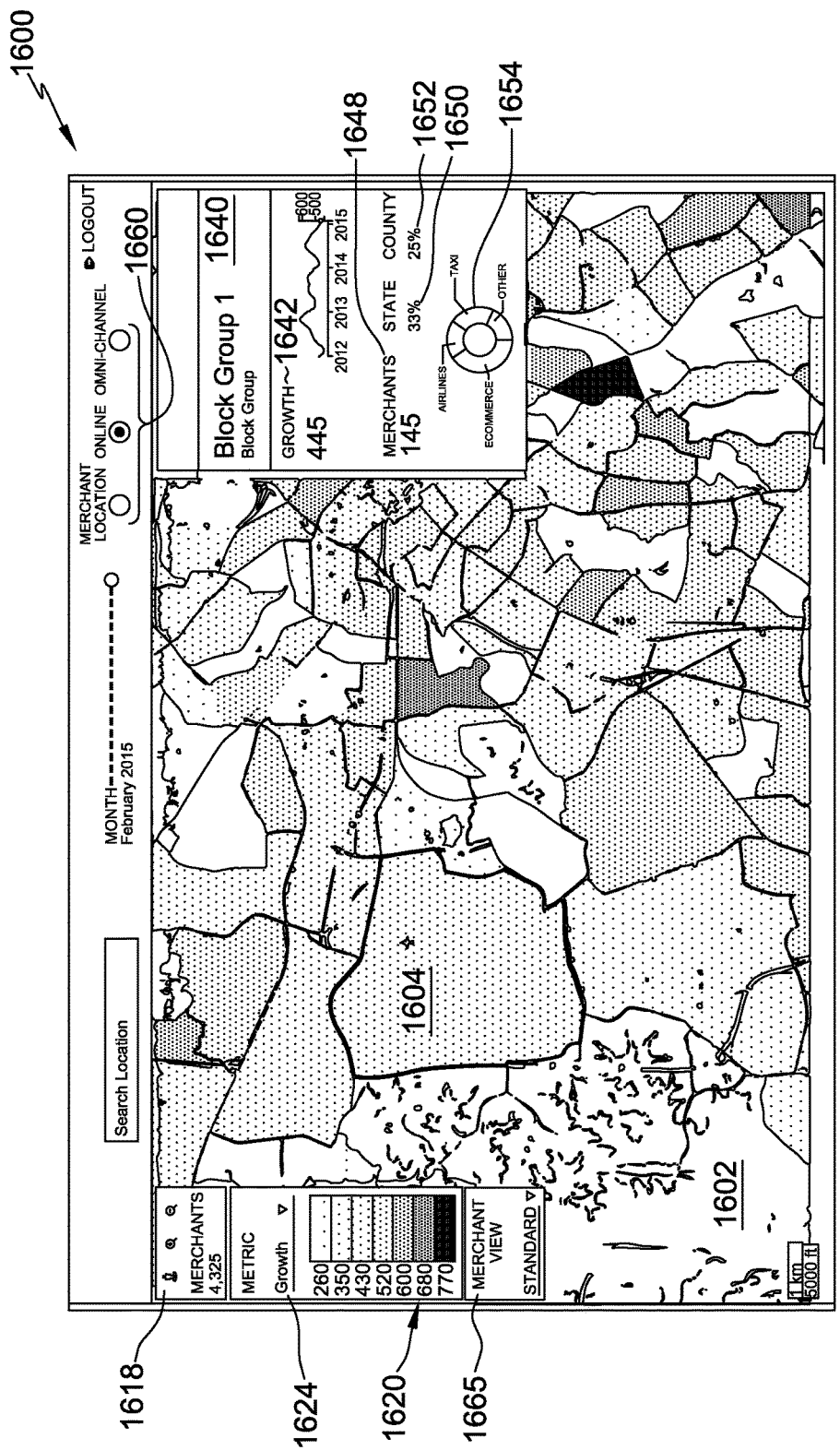

FIG. 16 depicts a screenshot 1600 showing a view 1602 that is same in geographical scale as views 802, 902, 1002, 1102, 1202, and 1302 (shown in FIGS. 8-13). View 1602 reflects the "Online" selected in the display mode menu 1660 (in comparison, "Merchant Location" is selected in views 602, 702, 902, 1002, 1102, 1202, 1302, 1402, and 1502, shown in FIGS. 6-15). Accordingly, view 1602 includes only transactions indicated as online transactions by the online flag. The merchant number indicator 1618, the metric information module 1620, and information in the smart chart 1640 such as, but not limited to, the score 1642, the sector indicator 1644, the trend graph 1646, the merchant number indicator 1648, and the industry chart 1654 may be updated when changing display modes. In some implementations, view 1602 may identify each sector by the transaction location identifier(s) (e.g., "COMPANYA_55555") within the sector. For example, in certain embodiments, the sector indicator 1644 may be a transaction location identifier. The colors or shades of each sector in view 1602 may also be updated. In the illustrated embodiment, the industry chart 1654 includes "Ecommerce", "Airline", and "Taxi". It is to be understood that the industries shown in the industry chart 1654 may be configurable to add, edit, combine, divide, and/or delete industries displayed by the industry chart 1654. In some embodiments, "Ecommerce" may be divided into particular industries of the ecommerce similar to an industry chart in the "Merchant Location" display mode. "Airline" and "Taxi" may be combined to form, for example, a "Transportation" category.

Although view 1602 includes sectors similar to sectors shown in FIGS. 8-13, the sectors may be redefined when switching display modes. To transition between modes selected in the display mode menu 1660, MA computing device 112 (shown in FIG. 2) may update the merchant analytics of each sector using transaction data of online transactions. As described above, the transaction location identifier of an online transaction identifies a location of the virtual location identifier associated with the cardholder or the user computing device of the cardholder. Therefore the merchant analytics of each sector indicate the "origination" of transactions rather than the "destination" of transactions, i.e., a merchant location.

In some embodiments, when accessed by a user associated with a particular merchant, view 1602 may further include a merchant switch 1665 to enable the user to view merchant analytics for merchant in each sector. In certain embodiments, merchant switch 1665 may be displayed for each display mode of display mode menu 1660 or for a subset of display modes. The user may compare merchant analytics of the sectors to determine the performance of the merchant's ecommerce or transportation business of each sector. In the illustrated embodiment, the merchant switch 1665 is in a standard mode that displays a plurality of merchants. Selecting a merchant-specific mode may cause view 1602 to adjust and replace fields such as merchant number indicator 1648 with information such as the number of online transactions for only the merchant in the selected sector 1604.

Figure 17:
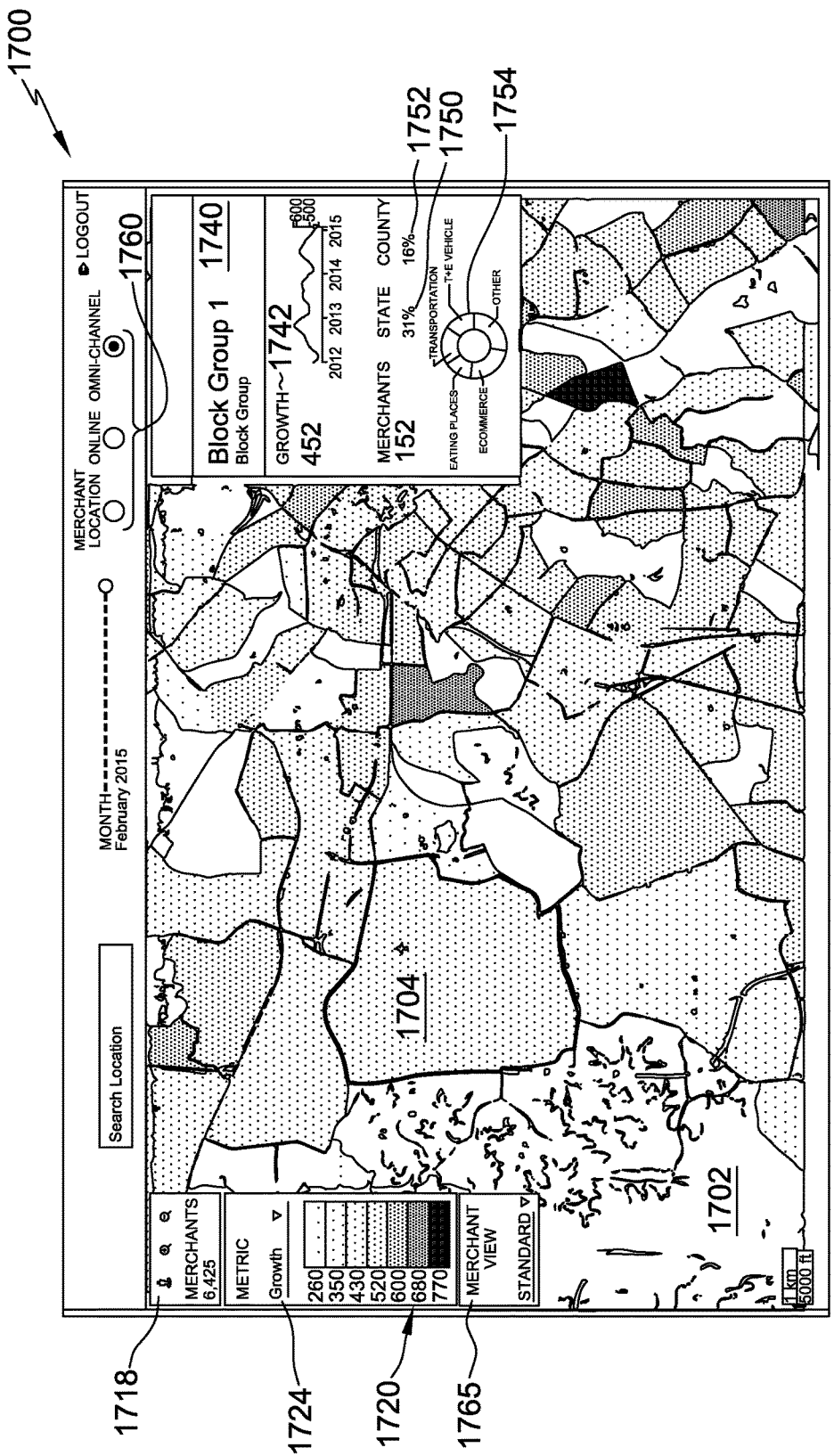

FIG. 17 depicts a screenshot 1700 showing a view 1702 that is same in geographical scale as views 802, 902, 1002, 1102, 1202, 1302, and 1602 (shown in FIGS. 8-13 and 16). View 1702 reflects the "Omni-Channel" selected in the display mode menu 1760 and includes transaction data from merchant location transactions and online transactions. In the exemplary embodiment, the merchant location transactions and the online transactions of a merchant may be grouped together and identified as the merchant. Some merchants may have a merchant location and online business in a sector. The analytics displayed in the "Merchant Location" display mode (e.g., FIGS. 6-15) and the "Online" display mode (e.g., FIG. 16) may overlap. In analytics including the merchant, the merchant location and online transactions are processed together to provide analytics indicative of the merchant's total performance in each sector. In other embodiments, the merchant location transactions and online transactions of a merchant may be represented as discrete and separate merchants in view 1702. In certain embodiments, view 1702 may include an input module (not shown) to switch between grouping and separating the types of transactions. Additionally or alternatively, view 1702 may be configured to enable a user to distinguish merchant location transactions and online transactions.

Although view 1702 includes sectors similar to sectors shown in FIGS. 8-13 and 16, the sectors may be redefined when switching display modes. In some implementations, MA computing device 112 (shown in FIG. 2) may define the sectors according to the merchant locations such that online transactions are included within sectors associated with the closest merchant location. The transaction data associated with merchant location transactions and online transactions in each sector are combined to generate the merchant analytics. The user may selectively change the sectors to view the merchant analytics in multiple perspectives. For example, the user may change view 1702 from displaying sectors according to zip codes to displaying sectors accordingly to the nearest merchant location.

Figure 18:
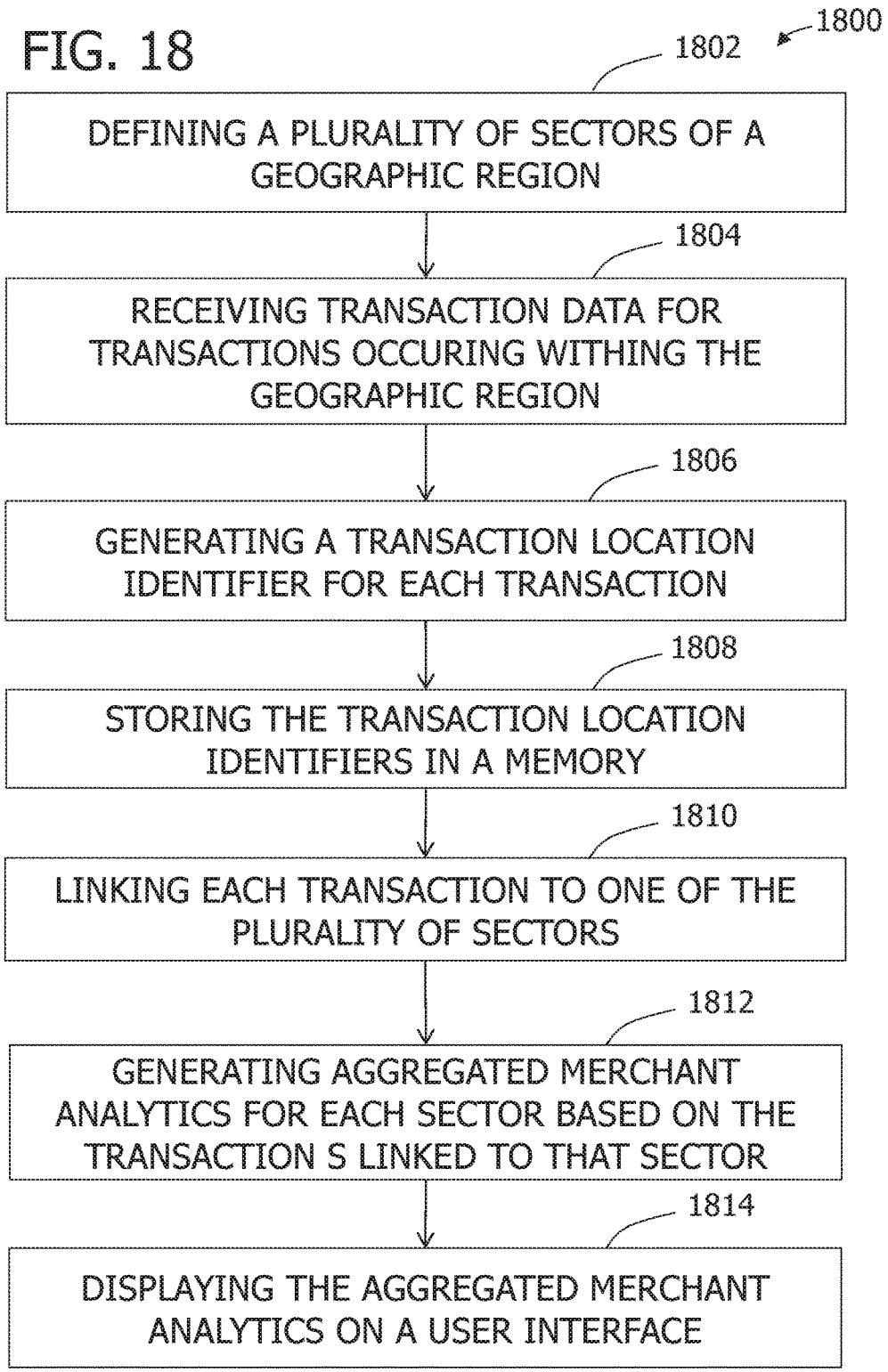

FIG. 18 is a simplified diagram of an example method 1800 for generating merchant analytics for a sector and providing the analytics on a user interface using MA computing device 112 (shown in FIG. 2). Specifically, MA computing device 112 defines 1802 a plurality of sectors of a geographic region. Additionally, MA computing device 112 receives 1804 transaction data (e.g., transaction data 540, shown in FIG. 5) for transactions occurring within the geographic region and a period of time. The transaction data is associated with a plurality of merchants that may include merchants located in the geographic region (i.e., merchant location transactions) and/or merchants associated with online transactions located in the geographic region. In the exemplary embodiment, the transaction data includes at least one online transaction. MA computing device generates 1806 a transaction location identifier for each transaction. The transaction location identifiers of any merchant location transactions (sometimes referred to as "merchant transaction location identifiers") may indicate a geographic location of the merchant location. The transaction location identifier of an online transaction represents a merchant involved in the online transaction and a geographic location associated with a user device operated by a cardholder associated with the online transaction. The geographic location associated with the user device may be, for example, where the online transaction was initiated or a location associated with the cardholder (e.g., a billing or home address). In the exemplary embodiment, MA computing device 112 stores 1808 the transaction location identifiers in a memory (e.g., memory area 310, shown in FIG. 3) for further analysis.

MA computing device 112, based on the transaction location identifiers, links 1810 each transaction to one sector of the plurality of sectors. Additionally, MA computing device 112 generates 1812 aggregated merchant analytics (e.g., as output 590, also shown in FIG. 5) for each sector based on the transactions linked to that sector. The aggregated merchant analytics may represent a ranking of each sector within the plurality of sectors. Additionally, MA computing device 112 causes 1814 the aggregated merchant analytics to be displayed on a user interface of a user computing device (e.g., user interface 118 and client system 114, shown in FIG. 2). The aggregated merchant analytics may be graphically represented on a map of the defined sectors. "Display," as used in reference to MA computing device 112, may refer to any method in which MA computing device 112 facilitates or causes display of the merchant analytics on the user computing device.

Figure 19:
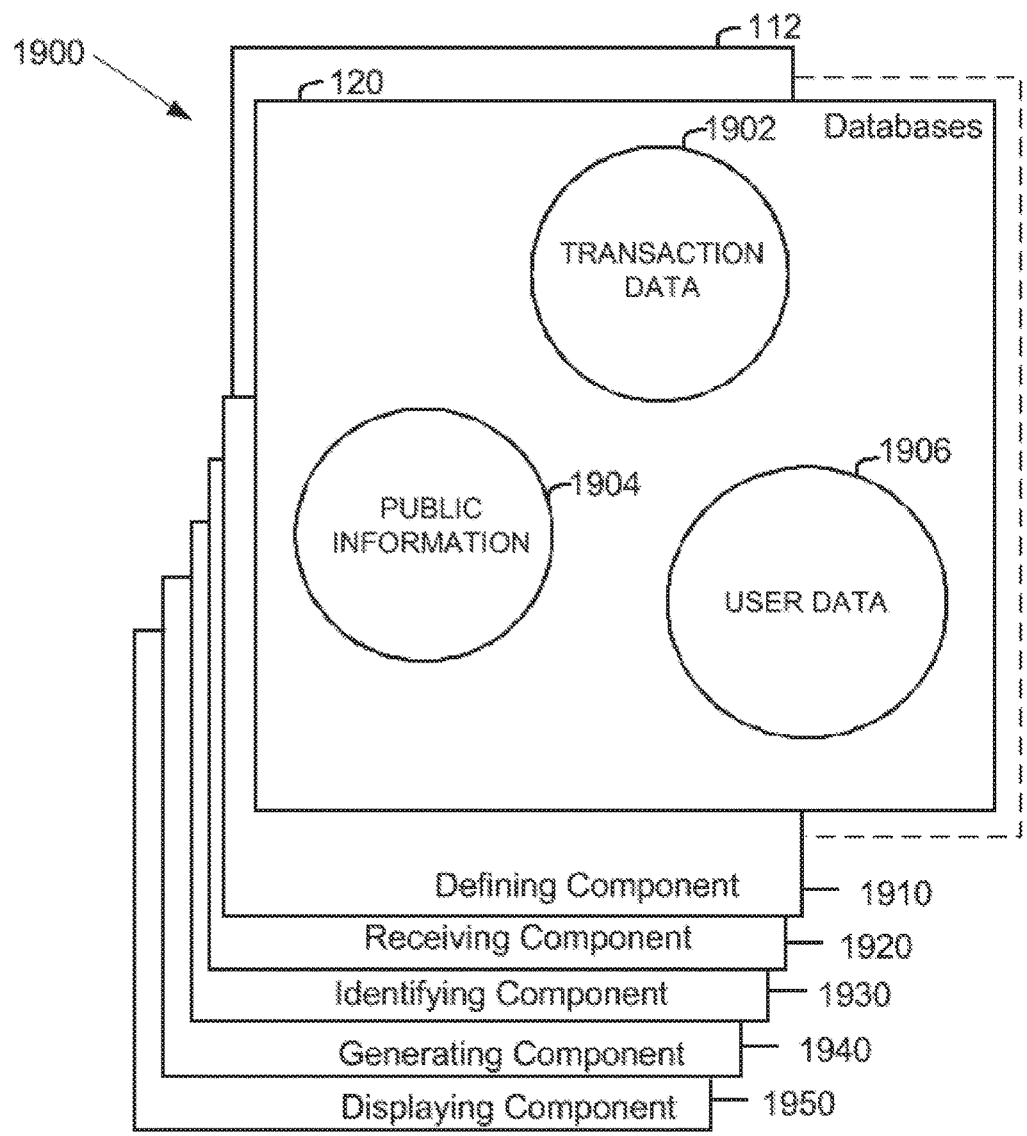

FIG. 19 is a diagram of components of one or more example computing devices that may be used in the environment shown in FIG. 2. FIG. 19 further shows a configuration of databases including at least database 120 (shown in FIG. 2). Database 120 may store information such as, for example, transaction data 1902, public information 1904, user data 1906, and cardholder computing device data (not shown). Database 120 is coupled to several separate components within MA computing device 112, which perform specific tasks.

MA computing device 112 includes a defining component 1910 for defining a plurality of sectors of a geographic region. Additionally, MA computing device 112 includes a receiving component 1920 for receiving transaction data for financial transactions occurring within a period of time. The transaction data is associated with a plurality of merchants. Each merchant of the plurality of merchants is located in the geographic region or is associated with online transactions located in the geographic region. Additionally, MA computing device 112 includes an identifying component 1930 for identifying, for each merchant of the plurality of merchants, one sector of the plurality of sectors in which the merchant is located. Identifying component 1930 is further configured to identify whether the transaction data includes online transactions and which sector includes each online transaction. Additionally, MA computing device 112 includes a generating component 1940 for generating aggregated merchant analytics for each sector based on the transaction data associated with all merchants of the plurality of merchants in the sector (including merchant location transactions and/or online transactions). The aggregated merchant analytics represent a ranking of each sector relative to all other sectors of the plurality of sectors. Additionally, MA computing device 112 includes a displaying component 1950 (alternatively referred to as a "display component") for displaying on a user interface the aggregated merchant analytics. The aggregated merchant analytics are graphically represented on a map of the defined sectors.

In some implementations, generating component 1940 (or any other component of MA computing device 112) may be further configured to calculate a growth of each sector using received transaction data for a subset of the plurality of merchants in each corresponding sector. The growth represents a difference in total sales revenue in each sector from a beginning of the period of time to an end of the period of time. Generating component 1940 may be further configured to determine a relative ranking for each sector by comparing the growth of each sector of the plurality of sectors and generate the growth score for each sector based on the relative ranking.

In some implementations, generating component 1940 (or any other component of MA computing device 112) may be further configured to calculate a stability of each sector using received transaction data for a subset of the plurality of merchants in each corresponding sector. The stability represents maintenance of total sales revenue within a range of values around an average value of the total sales revenue in each sector during the period of time. Generating component 1940 may be further configured to determine a relative ranking for each sector by comparing the stability of each sector of the plurality of sectors, and generate the stability score for each sector based on the relative ranking.

In some implementations, generating component 1940 (or any other component of MA computing device 112) may be further configured to calculate a size of each sector using received transaction data for a subset of the plurality of merchants in each corresponding sector. The size represents a total sales revenue in each sector during the period of time. Generating component 1940 may be further configured to determine a relative ranking for each sector by comparing the size of each sector of the plurality of sectors, and generate the size score for each sector based on the relative ranking.

In some implementations, generating component 1940 (or any other component of MA computing device 112) may be further configured to calculate a traffic of each sector using received transaction data for a subset of the plurality of merchants in each corresponding sector. The traffic represents a number of transactions initiated in each sector during the period of time. Generating component 1940 may be further configured to determine a relative ranking for each sector by comparing the traffic of each sector of the plurality of sectors, and generate the traffic score for each sector based on the relative ranking.

In some implementations, generating component 1940 (or any other component of MA computing device 112) may be further configured to calculate an average ticket size for each sector using received transaction data for a subset of the plurality of merchants in each corresponding sector. The average ticket size represents an average transaction amount in each sector during the period of time, and the average ticket size may be calculated by dividing a total sales revenue for a sector by a number of transactions initiated in the sector during the period of time. Generating component 1940 may be further configured to determine a relative ranking for each sector by comparing the average ticket size of each sector of the plurality of sectors, and generate the ticket size score for each sector based on the relative ranking.

In some implementations, generating component 1940 (or any other component of MA computing device 112) may be further configured to generate a growth score for each sector. The growth score represents a first relative ranking of the plurality of sectors based on a difference in total sales revenue in each sector from a beginning of the period of time to an end of the period of time. Generating component 1940 may also be configured to generate a stability score for each sector. The stability score represents a second relative ranking of the plurality of sectors based on a maintenance of a total sales revenue within a range of values around an average value of the total sales revenue in each sector during the period of time. Generating component 1940 may be further configured to generate a size score for each sector. The size score represents a third relative ranking of the plurality of sectors based on the total sales revenue in each sector during the period of time. Generating component 1940 may also be configured to generate a traffic score each sector. The traffic score represents a fourth relative ranking of the plurality of sectors based on a number of transactions initiated in each sector during the period of time. Generating component 1940 may further be configured to generate a ticket size score for each sector. The ticket size score represents a fifth relative ranking of the plurality of sectors based on an average transaction amount in each sector during the period of time. Generating component 1940 may still further be configured to generate the composite score for each sector. The composite score represents a sixth relative ranking of the plurality of sectors based on an aggregation of the growth score, the stability score, the size score, the traffic score, and the ticket size score of each sector.

In some implementations, generating component 1940 may be configured to generate a merchant record for each merchant of the plurality of merchants. The merchant record may be configured such that transaction data and merchant analytics corresponding to merchant location transactions and online transactions may be distinguishable for each other. Receiving component 1920 may be configured to receive an investment goal associated with the plurality of merchants. Identifying component 1930 may be configured to sort the plurality of merchant records according to the investment goal and the merchant analytics for each sector in which each merchant of the plurality of merchants is located. Causing or displaying component 1950 may be configured to present the sorted merchant records in an optimized merchant management portfolio.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for generating aggregated merchant analytics for a sector, said method implemented by a merchant analytics (MA) computing device including at least one processor in communication with a memory, the MA computing device in communication with a user computing device, said method comprising:

selecting a geographic region of interest having a plurality of merchants physically located within the geographic region;

receiving, at the MA computing device from a payment processing network server, transaction data for a plurality of transactions occurring within the geographic region and a predetermined period of time, the transaction data for each transaction of the plurality of transactions including a merchant identifier of a respective merchant involved in the transaction, the plurality of transactions including at least one card-not-present online transaction and at least one card-present merchant location transaction, each online transaction initiated at a respective online merchant, each merchant location transaction initiated at a respective physical merchant within the geographic region, wherein the transaction data for each online transaction indicates that the respective transaction is an online transaction;

storing the transaction data in the memory;

identifying a respective geographic location of each of the plurality of merchants within the geographic region, wherein the respective geographic location includes at least one of a zip code, a zip+4 code, a county, a city, or a neighborhood within a city;

defining each sector of a plurality of sectors included by assigning to each sector respective geographic boundaries according to predefined jurisdictional boundaries within the geographic region, each sector including a corresponding subset of the plurality of merchants, irrespective of a geographic size of any sector;

for each merchant location transaction, generating a first value for a first transaction location identifier, wherein the first value combines the merchant identifier for the respective merchant location transaction and the respective geographic location of the physical merchant at which the respective merchant location transaction was initiated;

for each online transaction, associating a second transaction location identifier with a cardholder location of a cardholder by creating a virtual location identifier, wherein the virtual location identifier includes a device location of a user computing device operated by the cardholder to initiate the respective online transaction, and wherein the virtual location identifier includes at least one of a zip code, a zip+4 code, a county, a city, or a neighborhood within a city;

for each online transaction, generating a second value for the second transaction location identifier, wherein the second value combines the merchant identifier for the respective online transaction and the virtual location identifier associated with the respective online transaction;

storing the first and second values in the memory;

linking, based on the first transaction location identifier, each merchant location transaction to a respective sector of the plurality of sectors;

linking, based on the second transaction location identifier, each online transaction to a respective sector of the plurality of sectors;

generating, using the MA computing device, first aggregated merchant analytics for each sector based on one or more online transactions linked to the sector, wherein the first aggregated merchant analytics represent a ranking of each sector relative to all other sectors of the plurality of sectors based on the respective one or more online transactions linked to each sector;

generating, using the MA computing device, second aggregated merchant analytics for each sector based on one or more merchant location transactions linked to the sector, wherein the second aggregated merchant analytics represent a ranking of each sector relative to all other sectors of the plurality of sectors based on the respective one or more merchant location transactions linked to each sector;

causing the first aggregated merchant analytics to be displayed on the user computing device at least partially overlaid on a map of the defined sectors in response to user input selecting an online transaction display mode; and causing the second aggregated merchant analytics to be displayed on the user computing device at least partially overlaid on the map of the defined sectors in response to user input selecting a merchant location transaction display mode.

2. The method of claim 1, wherein the first aggregated merchant analytics include a growth score, said method further comprising:
calculating a growth of each sector based on the one or more online transactions linked to that sector, wherein the growth represents a change in total sales revenue in that sector between a beginning of the predetermined period of time and an end of the predetermined period of time;
determining the ranking for each sector based on the calculated growth of each sector; and
generating the growth score for each sector based on the determined ranking.

3. The method of claim 1, wherein the first aggregated merchant analytics include a stability score, said method further comprising:
calculating a stability of each sector based on the one or more online transactions linked to that sector, wherein the stability represents maintenance of total sales revenue within a range of values around an average value of the total sales revenue in the sector during the predetermined period of time;
determining the ranking for each sector based on the calculated stability of each sector; and
generating the stability score for each sector based on the determined ranking.

4. The method of claim 1, wherein the first aggregated merchant analytics include a size score, said method further comprising:
calculating a size of each sector based on the one or more online transactions linked to that sector, wherein the size represents a total sales revenue in that sector during the predetermined period of time;
determining the ranking for each sector based on the calculated size of each sector; and
generating the size score for each sector based on the determined ranking.

5. The method of claim 1, wherein the first aggregated merchant analytics include a traffic score, said method further comprising:
calculating a traffic of each sector based on the one or more online transactions linked to that sector, wherein the traffic represents a number of transactions initiated in that sector during the predetermined period of time;
determining a relative ranking for each sector based on the calculated traffic of each sector; and
generating the traffic score for each sector based on the determined ranking.

6. The method of claim 1, wherein the first aggregated merchant analytics include a ticket size score, said method further comprising:
calculating an average ticket size for each sector based on the one or more online transactions linked to that sector, wherein the average ticket size represents an average transaction amount in that sector during the predetermined period of time, and wherein the average ticket size is calculated by dividing a total sales revenue for each sector by a number of transactions initiated in that sector during the predetermined period of time;
determining the ranking for each sector by comparing the calculated average ticket size of each sector; and
generating the ticket size score for each sector based on the determined ranking.

7. The method of claim 1, wherein the first aggregated merchant analytics include a composite score, said method further comprising:
generating a growth score for each sector, wherein the growth score represents a first relative ranking of the plurality of sectors based on a change in total sales revenue in each sector from a beginning of the predetermined period of time to an end of the predetermined period of time;
generating a stability score for each sector, wherein the stability score represents a second relative ranking of the plurality of sectors based on a maintenance of a total sales revenue within a range of values around an average value of the total sales revenue in each sector during the predetermined period of time;
generating a size score for each sector, wherein the size score represents a third relative ranking of the plurality of sectors based on the total sales revenue in each sector during the predetermined period of time;

generating a traffic score each sector, wherein the traffic score represents a fourth relative ranking of the plurality of sectors based on a number of transactions initiated in each sector during the predetermined period of time;

generating a ticket size score for each sector, wherein the ticket size score represents a fifth relative ranking of the plurality of sectors based on an average transaction amount in each sector during the predetermined period of time; and generating the composite score for each sector, wherein the composite score represents a sixth relative ranking of the plurality of sectors based on an aggregation of the growth score, the stability score, the size score, the traffic score, and the ticket size score of each sector.

8. The method of claim 1, wherein creating the virtual location identifier is based on one of (i) an identified internet protocol (IP) address associated with the user computing device, and (ii) at least one of a shipping address, a mailing address, and a billing address provided by the cardholder.

9. The method of claim 1, further comprising causing the first and second aggregated merchant analytics to be simultaneously displayed on the user computing device at least partially overlaid on the map of the defined sectors in response to user input selecting a combination transaction display mode.

10. The method of claim 1, wherein the predefined jurisdictional boundaries include at least one of a census block, a neighborhood, a city, a county, a state, and a country, and wherein linking each online transaction to the respective sector of the plurality of sectors includes, for at least one online transaction having the virtual location identifier corresponding to an area that spans multiple sectors, recursively retrieving additional location information from the virtual location identifier until the additional location information is sufficient to narrow the transaction location identifier to within a single sector.

11. A merchant analytics (MA) computing device comprising at least one processor in communication with a memory, said merchant analytics computing device in communication with a user computing device, said at least one processor programmed to:

select a geographic region of interest having a plurality of merchants physically located within the geographic region;

receive, from a payment processing network server, transaction data for a plurality of transactions occurring within the geographic region and a predetermined period of time, the transaction data for each transaction of the plurality of transactions including a merchant identifier of a respective merchant involved in the transaction, the plurality of transactions including at least one card-not-present online transaction and at least one card- present merchant location transaction, each online transaction initiated at a respective online merchant, each merchant location transaction initiated at a respective physical merchant within the geographic region, wherein the transaction data for each online transaction indicates that the respective transaction is an online transaction;

store the transaction data in the memory;

identify a respective geographic location of each of the merchants within the geographic region, wherein the respective geographic location includes at least one of a zip code, a zip+4 code, a county, a city, or a neighborhood within a city;

define each sector of a plurality of sectors by assigning to each sector respective geographic boundaries according to predefined jurisdictional boundaries within the geographic region, each sector including a corresponding subset of the plurality of merchants, irrespective of a geographic size of any sector;

for each merchant location transaction, generate a first value for a first transaction location identifier, wherein the first value combines the merchant identifier for the respective merchant location transaction and the respective geographic location of the physical merchant at which the respective merchant location transaction was initiated;

for each online transaction, associating a second transaction location identifier with a cardholder location of a cardholder by creating a virtual location identifier for, wherein the virtual location identifier includes a device location of a user computing device operated by the cardholder to initiate the respective online transaction, and wherein the virtual location identifier includes at least one of a zip code, a zip+4 code, a county, a city, or a neighborhood within a city;

for each online transaction, generate a second value for the second transaction location identifier, wherein the second value combines the merchant identifier for the respective online transaction and the virtual location identifier associated with the respective online transaction;

store the first and second values in the memory;

link, based on the first transaction location identifier, each merchant location transaction to a respective sector of the plurality of sectors;

link, based on the second transaction location identifier, each online transaction to a respective sector of the plurality of sectors;

generate first aggregated merchant analytics for each sector based on one or more online transactions linked to the sector, wherein the first aggregated merchant analytics represent a ranking of each sector relative to all other sectors of the plurality of sectors based on the respective one or more online transactions linked to each sector;

generate second aggregated merchant analytics for each sector based on one or more merchant location transactions linked to the sector, wherein the second aggregated merchant analytics represent a ranking of each sector relative to all other sectors of the plurality of sectors based on the respective one or more merchant location transactions linked to each sector;

cause the first aggregated merchant analytics to be displayed on the user computing device at least partially overlaid on a map of the defined sectors in response to user input selecting an online transaction display mode; and cause the second aggregated merchant analytics to be displayed on the user computing device at least partially overlaid on the map of the defined sectors in response to user input selecting a merchant location transaction display mode.

12. The MA computing device of claim 11, wherein to generate the first aggregated merchant analytics, said at least one processor is further programmed to:

calculate a growth of each sector based on the one or more online transactions linked to that sector, wherein the growth represents a change in total sales revenue in that sector between a beginning of the predetermined period of time and an end of the predetermined period of time;

determine the ranking for each sector based on the calculated growth of each sector; and generate a growth score for each sector based on the determined ranking.

13. The MA computing device of claim 11, wherein to generate the first aggregated merchant analytics, said at least one processor is further programmed to:

calculate a stability of each sector based on the one or more online transactions linked to that sector, wherein the stability represents maintenance of total sales revenue within a range of values around an average value of the total sales revenue in the sector during the predetermined period of time;

determine the ranking for each sector based on the calculated stability of each sector; and generate a stability score for each sector based on the determined ranking.

14. The MA computing device of claim 11, wherein to generate the first aggregated merchant analytics, said at least one processor is further programmed to:

calculate a traffic of each sector based on the one or more online transactions linked to that sector, wherein the traffic represents a number of transactions initiated in that sector during the predetermined period of time;

determine a relative ranking for each sector based on the calculated traffic of each sector; and generate a traffic score for each sector based on the determined ranking.

15. The MA computing device of claim 11, wherein to generate the first aggregated merchant analytics, said at least one processor is further programmed to:

calculate an average ticket size for each sector based on the one or more online transactions linked to that sector, wherein the average ticket size represents an average transaction amount in that sector during the predetermined period of time, and wherein the average ticket size is calculated by dividing a total sales revenue for each sector by a number of transactions initiated in that sector during the predetermined period of time;

determine the ranking for each sector by comparing the calculated average ticket size of each sector; and generate a ticket size score for each sector based on the determined ranking.

16. The MA computing device of claim 11, wherein the first aggregated merchant analytics include a composite score, said at least one processor is further programmed to:

generate a growth score for each sector, wherein the growth score represents a first relative ranking of the plurality of sectors based on a change in total sales revenue in each sector from a beginning of the predetermined period of time to an end of the predetermined period of time;

generate a stability score for each sector, wherein the stability score represents a second relative ranking of the plurality of sectors based on a maintenance of a total sales revenue within a range of values around an average value of the total sales revenue in each sector during the predetermined period of time;

generate a size score for each sector, wherein the size score represents a third relative ranking of the plurality of sectors based on the total sales revenue in each sector during the predetermined period of time;

generate a traffic score each sector, wherein the traffic score represents a fourth relative ranking of the plurality of sectors based on a number of transactions initiated in each sector during the predetermined period of time;

generate a ticket size score for each sector, wherein the ticket size score represents a fifth relative ranking of the plurality of sectors based on an average transaction amount in each sector during the predetermined period of time; and generate the composite score for each sector, wherein the composite score represents a sixth relative ranking of the plurality of sectors based on an aggregation of the growth score, the stability score, the size score, the traffic score, and the ticket size score of each sector.

17. The MA computing device of claim 11, wherein said at least one processor is further programmed to create the virtual location identifier based on one of (i) an identified internet protocol (IP) address associated with the user computing device, and (ii) at least one of a shipping address, a mailing address, and a billing address provided by the cardholder.

18. The MA computing device of claim 11, wherein said at least one processor is further programmed to cause the first and second aggregated merchant analytics to be simultaneously displayed on the user computing device at least partially overlaid on the map of the defined sectors in response to user input selecting a combination transaction display mode.

19. The MA computing device of claim 11, wherein the predefined jurisdictional boundaries include at least one of a census block, a neighborhood, a city, a county, a state, and a country, and wherein said at least one processor is further programmed to link at least one online transaction, having the virtual location identifier corresponding to an area that spans multiple sectors, to the respective sector of the plurality of sectors by recursively retrieving additional location information from the virtual location identifier until the additional location information is sufficient to narrow the transaction location identifier to within a single sector.

20. A non-transitory computer-readable storage medium having computer-executable instructions embodied thereon, wherein when executed by a merchant analytics (MA) computing device including at least one processor in communication with a memory, the computer-executable instructions cause the MA computing device to:

select a geographic region of interest having a plurality of merchants physically located within the geographic region;

receive, from a payment processing network server, transaction data for a plurality of transactions occurring within the geographic region and a predetermined period of time, the transaction data for each transaction of the plurality of transactions including a merchant identifier of a respective merchant involved in the transaction, the plurality of transactions including at least one card-not-present online transaction and at least one card-present merchant location transaction, each online transaction initiated at a respective online merchant, each merchant location transaction initiated at a respective physical merchant within the geographic region, wherein the transaction data for each online transaction indicates that the respective transaction is an online transaction;

store the transaction data in the memory;

identify a respective geographic location of each of the plurality of merchants within the geographic region, wherein the respective geographic location includes at least one of a zip code, a zip+4 code, a county, a city, or a neighborhood within a city;

define each sector of a plurality of sectors by assigning to each sector respective geographic boundaries according to predefined jurisdictional boundaries within the geographic region, each sector including a corresponding subset of the plurality of merchants, irrespective of a geographic size of any sector;

for each merchant location transaction, generate a first value for a first transaction location identifier, wherein the first value combines the merchant identifier for the respective merchant location transaction and the respective geographic location of the physical merchant at which the respective merchant location transaction was initiated;

for each online transaction, associating a second transaction location identifier with a cardholder location of a cardholder by creating a virtual location identifier for, wherein the virtual location identifier includes a device location of a user computing device operated by the cardholder to initiate the respective online transaction, and wherein the virtual location identifier includes at least one of a zip code, a zip+4 code, a county, a city, or a neighborhood within a city;

for each online transaction, generate a second value for the second transaction location identifier, wherein the second value combines the merchant identifier for the respective online transaction and the virtual location identifier associated with the respective online transaction;

store the first and second values in the memory;

link, based on the first transaction location identifier, each merchant location transaction to a respective sector of the plurality of sectors;

link, based on the second transaction location identifier, each online transaction to a respective sector of the plurality of sectors;

generate first aggregated merchant analytics for each sector based on one or more online transactions linked to the sector, wherein the first aggregated merchant analytics represent a ranking of each sector relative to all other sectors of the plurality of sectors based on the respective one or more online transactions linked to each sector;

generate second aggregated merchant analytics for each sector based on one or more merchant location transactions linked to the sector, wherein the second aggregated merchant analytics represent a ranking of each sector relative to all other sectors of the plurality of sectors based on the respective one or more merchant location transactions linked to each sector;

cause the first aggregated merchant analytics to be displayed on the user computing device at least partially overlaid on a map of the defined sectors in response to user input selecting an online transaction display mode; and cause the second aggregated merchant analytics to be displayed on the user computing device at least partially overlaid on the map of the defined sectors in response to user input selecting a merchant location transaction display mode.

21. The computer-readable storage medium of claim 20, wherein to generate the first aggregated merchant analytics, the computer-executable instructions further cause the MA computing device to:

calculate a growth of each sector based on the one or more online transactions linked to that sector, wherein the growth represents a change in total sales revenue in that sector between a beginning of the predetermined period of time and an end of the predetermined period of time;

determine the ranking for each sector based on the calculated growth of each sector; and generate a growth score for each sector based on the determined ranking.

22. The computer-readable storage medium of claim 20, wherein to generate the first aggregated merchant analytics, the computer-executable instructions further cause the MA computing device to:

generate a growth score for each sector, wherein the growth score represents a first relative ranking of the plurality of sectors based on a change in total sales revenue in each sector from a beginning of the predetermined period of time to an end of the predetermined period of time;

generate a stability score for each sector, wherein the stability score represents a second relative ranking of the plurality of sectors based on a maintenance of a total sales revenue within a range of values around an average value of the total sales revenue in each sector during the predetermined period of time;

generate a size score for each sector, wherein the size score represents a third relative ranking of the plurality of sectors based on the total sales revenue in each sector during the predetermined period of time;

generate a traffic score each sector, wherein the traffic score represents a fourth relative ranking of the plurality of sectors based on a number of transactions initiated in each sector during the predetermined period of time;

generate a ticket size score for each sector, wherein the ticket size score represents a fifth relative ranking of the plurality of sectors based on an average transaction amount in each sector during the predetermined period of time; and generate the composite score for each sector, wherein the composite score represents a sixth relative ranking of the plurality of sectors based on an aggregation of the growth score, the stability score, the size score, the traffic score, and the ticket size score of each sector.

23. The computer-readable storage medium of claim 20, wherein the computer-executable instructions further cause the MA computing device to create the virtual location identifier based on one of (i) an identified internet protocol (IP) address associated with the user computing device, and (ii) at least one of a shipping address, a mailing address, and a billing address provided by the cardholder.

24. The computer-readable storage medium of claim 20, wherein the computer-executable instructions further cause the MA computing device to cause the first and second aggregated merchant analytics to be simultaneously displayed on the user computing device at least partially overlaid on the map of the defined sectors in response to user input selecting a combination transaction display mode.

\* \* \* \* \*